[19] United States Patent
Berger et al.

[11] 3,896,145
[45] July 22, 1975

[54] CARBAZOLES

[75] Inventors: Leo Berger, Montclair; Alfred John Corraz, Wayne, both of N.J.

[73] Assignee: Hoffmann-La Roche Inc., Nutley, N.J.

[22] Filed: May 17, 1973

[21] Appl. No.: 361,103

Related U.S. Application Data

[63] Continuation-in-part of Ser. No. 274,142, July 24, 1972, abandoned.

[52] U.S. Cl........ 260/315; 260/397.6; 260/397.7 R; 260/468 R; 260/468 K; 260/465 E; 260/471 R; 260/514 R; 260/514 K; 260/518 R; 260/562 H; 260/569
[51] Int. Cl............................................. C07d 27/68
[58] Field of Search .................................... 260/315

[56] References Cited
OTHER PUBLICATIONS
Bull. Soc. Chim. France 1958: 290–292, Hoi et al.
Bull. Soc. Chim. France 1967: 4126–4128, Hoi et al.
C.A. 45: 2468 f,g (1951), Manske et al.
JACS 68: 2104–2105 (1946), Gilman et al.

*Primary Examiner*—John M. Ford
*Assistant Examiner*—S. D. Winters
*Attorney, Agent, or Firm*—Samuel L. Welt; Bernard S. Leon; William G. Isgro

[57] ABSTRACT

Carbazoles prepared, inter alia, from the corresponding phenyl hydrazines and corresponding cyclohexanones are described. The carbazoles of the invention are useful anti-inflammatory, analgesic and antirheumatic agents.

20 Claims, No Drawings

CARBAZOLES

CROSS-REFERENCE TO RELATED APPLICATIONS

This application is a continuation-in-part application of U.S. Pat. application Ser. No. 274,142, filed July 24, 1972, now abandoned.

BRIEF SUMMARY OF THE INVENTION

The invention relates to compounds of the formula

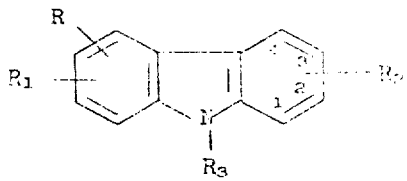

wherein R is hydrogen, halogen, hydroxy, cyano, lower alkyl, hydroxy-lower alkyl, lower alkoxy, acyl, benzyloxy, lower alkylthio, trifluoromethyl, carboxy, carbo-lower alkoxy, nitro, amino, mono-lower alkylamino, di-lower alkylamino, sulfamoyl, di-lower alkylsulfamoyl or difluoromethylsulfonyl; $R_1$ is halogen, cyano, lower alkyl, hydroxylower alkyl, lower alkoxy, acyl, acylamido, benzyloxy, lower alkylthio, trifluoromethyl, hydroxy, carboxy, carbo-lower alkoxy, nitro, amino, mono-lower alkylamino, di-lower alkylamino, sulfamoyl, di-lower alkylsulfamoyl or difluoromethylsulfonyl, or R taken together with an adjacent $R_1$ is also lower alkylenedioxy; $R_2$ is

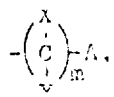

wherein A is cyano, hydroxy, lower alkoxy, aminolower alkoxy, monolower alkylamino-lower alkoxy or di-lower alkylamino-lower alkoxy, X and Y, independently, are hydrogen or lower alkyl, and m is 1 to 7, or $R_2$ is

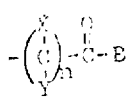

wherein B is hydroxy, carboxy, lower alkoxy, amino, hydroxyamino, mono-lower alkylamino, di-lower alkylamino, amino-lower alkoxy, mono-lower alkylamino-lower alkoxy or di-lower alkylamino-lower alkoxy, Y and X, independently, are hydrogen or lower alkyl; n is 1 to 7; and $R_3$ is hydrogen, lower alkyl, lower alkoxycarbonyllower alkyl, carboxy-lower alkyl, acyl, halo-substituted acyl, aralkyl or haloaralkyl; and when X and Y are different, their enantiomers; when R or $R_1$ is carboxy and/or when B is hdyroxy or carboxy, salts thereof with pharmaceutically acceptable bases; and when R or $R_1$ is amino, mono-lower alkylamino or di-lower alkylamino, and/or when B or A is amino-lower alkoxy, mono-lower alkylamino-lower alkoxy or dilower alkylamino-lower alkoxy, addition salts thereof with pharmaceutically acceptable acids. The carbazoles of formula I are useful as anti-inflammatory, analgesic and anti-rheumatic agents.

Compounds of formula I wherein R, $R_1$ and $R_3$ are hydrogen and $R_2$ is

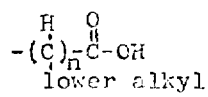

are also within the scope of the invention and are useful anti-inflammatory, analgesic and anti-rheumatic agents.

DETAILED DESCRIPTION OF THE INVENTION

As used herein, the term "lower alkyl" denotes a straight or branched chain hydrocarbon group containing 1–7 carbon atoms, for example, methyl, ethyl, propyl, isopropyl, butyl, isobutyl, tertiary butyl, neopentyl, pentyl, heptyl, and the like. The term "lower alkoxy" denotes an alkyl ether group in which the alkyl group is as described above, for example, methoxy, ethoxy, propoxy, isopropoxy, butoxy, pentoxy and the like. The term "lower alkylthio" denotes an alkyl thioether group in which the alkyl group is as described above, for example, methylthio, ethylthio, propylthio, isopropylthio, butylthio, pentylthio and the like. The term "halogen" denotes all the halogens, that is, bromine, chlorine, fluorine and iodine; bromine and chlorine are preferred. The term "aryl" denotes phenyl or phenyl bearing one or more substituents selected from the group consisting of halogen, trifluoromethyl, lower alkyl, lower alkoxy, nitro, amino, lower alkylamino and di-lower alkylamino. The term "aralkyl" as used herein denotes a straight or branched chain lower alkyl group in which one or more of the hydrogen atoms have been replaced by an aryl group. The term "acyl" denotes an "alkanoyl" group derived from an aliphatic carboxylic acid of 1 to 7 carbon atoms, for example, formyl, acetyl, propionyl, and the like, and an "aroyl" group derived from an aromatic carboxylic acid, such as benzoyl and the like. The term "lower alkylene" denotes a straight or branched chain alkylene of 1–7 carbon atoms, for example, methylene, ethylene, propylene, butylene, methylmethylene and the like. The term "lower alkylenedioxy" preferably denotes methylenedioxy and the like.

Exemplary of mono-lower alkylamino are methylamino, ethylamino and the like. Exemplary of di-lower alkylamino are dimethylamino, diethylamino and the like. Exemplary of aminolower alkoxy are aminomethoxy, aminoethoxy and the like. Exemplary of mono-lower alkylamino-lower alkoxy are methylaminomethoxy, ethylaminoethoxy and the like. Exemplary of di-lower alkylamino-lower alkoxy are dimethylaminomethoxy, diethylaminoethoxy and the like. Exemplary of di-lower alkylsulfamoyl are dimethylsulfamoyl, diethylsulfamoyl and the like.

The invention relates to compounds of the formula

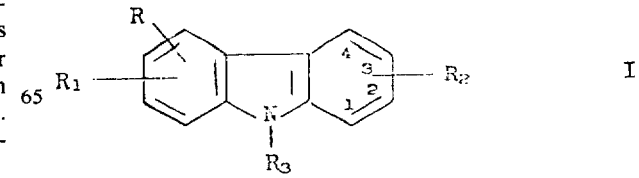

wherein R is hydrogen, halogen, hydroxy, cyano, lower alkyl, hydroxy-lower alkyl, lower alkoxy, acyl, benzyloxy, lower alkylthio, trifluoromethyl, carboxy, carbo-lower alkoxy, nitro, amino, mono-lower alkylamino, di-lower alkylamino, sulfamoyl, di-lower alkylsulfamoyl or difluoromethylsulfonyl; $R_1$ is halogen, cyano, lower alkyl, hydroxy-lower alkyl, lower alkoxy, acyl, acylamido, benzyloxy, lower alkylthio, trifluoromethyl, hydroxy, carboxy, carbolower alkoxy, nitro, amino, mono-lower alkylamino, dilower alkylamino, sulfamoyl, di-lower alkylsulfamoyl or difluoromethylsulfonyl, or R taken together with an adjacent $R_1$ is also lower alkylenedioxy; $R_2$ is

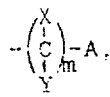

wherein A is cyano, hydroxy, lower alkoxy, amino-lower alkoxy, monolower alkylamino-lower alkoxy or di-lower alkylamino-lower alkoxy, Y and X, independently, are hydrogen or lower alkyl, and m is 1 to 7, or $R_2$ is

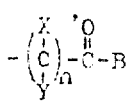

wherein B is hydroxy, carboxy, lower alkoxy, amino, hydroxyamino, mono-lower alkylamino, di-lower alkylamino, amino-lower alkoxy, mono-lower alkylamino-lower alkoxy or di-lower alkylaminolower alkoxy; Y and X, independently, are hydrogen or lower alkyl, n is 1 to 7; and $R_3$ is hydrogen, lower alkyl, lower alkoxycarbonyl-lower alkyl, carboxy-lower alkyl, acyl, halo-substituted acyl, aralkyl or haloaralkyl; and
when X and Y are different, their enantiomers; when R or $R_1$ is carboxy and/or when B is hydroxy or carboxy, salts thereof with pharmaceutically acceptable bases; and when R or $R_1$ is amino, mono-lower alkylamino or di-lower alkylamino, and/or when B or A is amino-lower alkoxy, mono-lower alkylamino-lower alkoxy or dilower alkylamino-lower alkoxy, addition salts thereof with pharmaceutically acceptable salts.

Compounds of formula I, wherein R, $R_1$ and $R_3$ are hydrogen and $R_2$ is

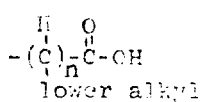

are also within the scope of the invention and are useful anti-inflammatory, analgesic and anti-rheumatic agents.

Preferred carbazoles of the invention are those characterized by the formulas

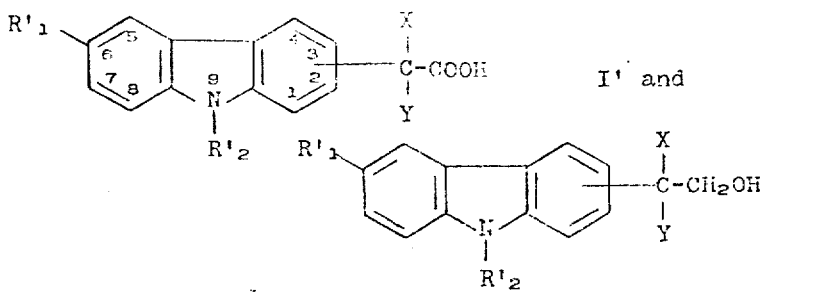

wherein $R'_1$ is halogen, lower alkyl or lower alkoxy, halogen is preferred; $R'_2$ is hydrogen or lower alkyl, hydrogen is preferred; and X and Y are as previously described, the 2-acids are preferred.
their enantiomers when X and Y are different, and salts of the compounds of formula I' with pharmaceutically acceptable bases. Preferably, in formula I $m$ or $n$ is 1.

Preferred compounds of formula I are:
racemic 6-chloro-α-methyl-carbazole-2-acetic acid;
(+) 6-chloro-α-methyl-carbazole-2-acetic acid;
(−) 6-chloro-α-methyl-carbazole-2-acetic acid;
racemic 2-(6-chloro-2-carbazolyl)propanol;
(+) 2-(6-chloro-2-carbazolyl)propanol;
(−) 2-(6-chloro-2-carbazolyl)propanol;
6-chloro-carbazole-2-acetic acid; and
6-chloro-9-methyl-carbazole-1-acetic acid.

Exemplary of compounds of this invention corresponding to formula I are:
6-chloro-carbazole-1-acetic acid;
6-chloro-carbazole-2-acetic acid ethyl ester;
6-methyl-carbazole-3-acetic acid;
6-methoxy-carbazole-4-acetic acid;
6-chloro-α-methyl-carbazole-1-acetic acid;
9-(4-chlorobenzyl)-6-methoxy-carbazole-2-acetic acid;
6-nitro-carbazole-3-acetic acid;
7-chloro-carbazole-4-acetic acid;
6-chloro-carbazole-2-acetic acid;
6-chloro-carbazole-3-acetic acid ethyl ester;
6-methyl-carbazole-4-acetic acid;
6-methoxy-carbazole-1-acetic acid;
6-chloro-α-methyl-carbazole-2-acetic acid;
9-(4-chlorobenzyl)-6-methoxy-carbazole-3-acetic acid;
6-nitro-carbazole-4-acetic acid;
7-chloro-carbazole-1-acetic acid;
6-chloro-carbazole-3-acetic acid;
6-chloro-carbazole-4-acetic acid ethyl ester;
6-methyl-carbazole-1-acetic acid;
6-methoxy-carbazole-2-acetic acid;
6-chloro-α-methyl-carbazole-3-acetic acid;
9-(4-chlorobenzyl)-6-methoxy-carbazole-4-acetic acid;
6-nitro-carbazole-1-acetic acid;
7-chloro-carbazole-2-acetic acid;
6-chloro-carbazole-4-acetic acid;
6-chloro-carbazole-1-acetic acid ethyl ester;
6-methyl-carbazole-2-acetic acid;
6-methoxy-carbazole-3-acetic acid;
6-chloro-α-methyl-carbazole-4-acetic acid;
9-(4-chlorobenzyl)-6-methoxy-carbazole-1-acetic acid;
6-nitro-carbazole-2-acetic acid;
7-chloro-carbazole-3-acetic acid;
7-methyl-carbazole-1-acetic acid;
8-chloro-carbazole-2-acetic acid;
6-fluoro-carbazole-3-acetic acid;
6-bromo-carbazole-4-acetic acid;
6,7-dichloro-carbazole-1-acetic acid;
5,6-dichloro-carbazole-2-acetic acid;
6-trifluoromethyl-carbazole-3-acetic acid;

6-chloro-7-methyl-carbazole-4-acetic acid;
6-chloro-5-methyl-carbazole-1-acetic acid;
α-methyl-carbazole-2-acetic acid;
7,8-dichloro-carbazole-3-acetic acid;
6-sulfamoylcarbazole-4-acetic acid;
6-difluoromethylsulfonyl-carbazole-1-acetic acid;
rac. 2-(6-chloro-2-carbazolyl)propanol-2-dimethylamino ethyl ether;
6-carbethoxy-carbazole-2-acetic acid;
5-chloro-6-sulfamylcarbazole-3-acetic acid;
6-chloro-9-(p-chlorobenzoyl)carbazole-4-acetic acid ethyl ester;
9-benzoyl-6-chloro-carbazole-1-acetic acid;
7-methyl-carbazole-2-acetic acid;
8-chloro-carbazole-3-acetic acid;
6-fluoro-carbazole-4-acetic acid;
6-bromo-carbazole-1-acetic acid;
6,7-dichloro-carbazole-2-acetic acid;
5,6-dichloro-carbazole-3-acetic acid;
6-trifluoromethyl-carbazole-4-acetic acid;
6-chloro-7-methyl-carbazole-1-acetic acid;
6-chloro-5-methyl-carbazole-2-acetic acid;
9-methyl-carbazole-3-acetic acid;
7,8-dichloro-carbazole-4-acetic acid;
6-sulfamoylcarbazole-1-acetic acid;
6-difluoromethylsulfonyl-carbazole-2-acetic acid;
6-carbethoxy-carbazole-3-acetic acid;
5-chloro-6-sulfamylcarbazole-4-acetic acid;
6-chloro-9-(p-chlorobenzoyl)carbazole-1-acetic acid ethyl ester;
9-benzoyl-6-chloro-carbazole-2-acetic acid;
7-methyl-carbazole-3-acetic acid;
8-chloro-carbazole-4-acetic acid;
6-fluoro-carbazole-1-acetic acid;
6-bromo-carbazole-2-acetic acid;
rac. 2-(6-chloro-2-carbazolyl)propanol methyl ether;
6,7-dichloro-carbazole-3-acetic acid;
5,6-dichloro-carbazole-4-acetic acid;
6-trifluoromethyl-carbazole-1-acetic acid;
6-chloro-7-methyl-carbazole-2-acetic acid;
6-chloro-5-methyl-carbazole-3-acetic acid;
9-methyl-carbazole-4-acetic acid;
7,8-dichloro-carbazole-1-acetic acid;
6-sulfamoylcarbazole-2-acetic acid;
6-difluoromethylsulfonyl-carbazole-3-acetic acid;
6-carbethoxy-carbazole-4-acetic acid;
5-chloro-6-sulfamylcarbazole-1-acetic acid;
6-chloro-9-(p-chlorobenzoyl)carbazole-2-acetic acid ethyl ester;
9-benzoyl-6-chloro-carbazole-3-acetic acid;
7-methyl-carbazole-4-acetic acid;
8-chloro-carbazole-1-acetic acid;
6-fluoro-carbazole-2-acetic acid;
6-bromo-carbazole-3-acetic acid;
6,7-dichloro-carbazole-4-acetic acid;
5,6-dichloro-carbazole-1-acetic acid;
6-trifluoromethyl-carbazole-2-acetic acid;
6-chloro-7-methyl-carbazole-3-acetic acid;
6-chloro-5-methyl-carbazole-4-acetic acid;
9-methyl-carbazole-1-acetic acid;
7,8-dichloro-carbazole-2-acetic acid;
6-sulfamoylcarbazole-3-acetic acid;
6-difluoromethylsulfonyl-carbazole-4-acetic acid;
6-carbethoxy-carbazole-1-acetic acid;
5-chloro-6-sulfamylcarbazole-2-acetic acid;
6-chloro-9-(p-chlorobenzyl)carbazole-3-acetic acid ethyl ester;
9-benzoyl-6-chloro-carbazole-4-acetic acid;
6-dimethylsulfamoyl-carbazole-1-acetic acid;
6-methylthio-carbazole-2-acetic acid;
6-benzyloxy-carbazole-3-acetic acid;
6-cyano-carbazole-4-acetic acid;
6-carboxy-carbazole-1-acetic acid;
6-ethyl-carbazole-2-acetic acid;
6,7-methylenedioxy-carbazole-3-acetic acid;
6-acetyl-carbazole-4-acetic acid;
6-iodo-carbazole-1-acetic acid;
6-chloro-carbazole-2-acetic acid dimethylamino ester;
6,9-dimethyl-carbazole-3-acetic acid;
6-chloro-carbazole-4-acetic acid dimethylaminoethyl ester hydrochloride;
6-chloro-N,N-dimethyl-carbazole-1-acetamide;
6-methyl-carbazole-2-acetic acid ethyl ester;
6-hydroxy-carbazole-3-acetic acid;
6-dimethylsulfamoyl-carbazole-2-acetic acid;
6-methylthio-carbazole-3-acetic acid;
6-benzyloxy-carbazole-4-acetic acid;
6-cyano-carbazole-1-acetic acid;
6-carboxy-carbazole-2-acetic acid;
6-ethyl-carbazole-3-acetic acid;
6,7-methylenedioxy-carbazole-4-acetic acid;
6-acetyl-carbazole-1-acetic acid;
6-iodo-carbazole-2-acetic acid;
6-chloro-carbazole-3-acetic acid dimethylamino ester;
6,9-dimethyl-carbazole-4-acetic acid;
6-chloro-carbazole-1-acetic acid dimethylaminoethyl ester hydrochloride;
6-chloro-N,N-dimethyl-carbazole-2-acetamide;
6-methyl-carbazole-3-acetic acid ethyl ester;
6-hydroxy-carbazole-4-acetic acid;
6-dimethylsulfamoyl-carbazole-3-acetic acid;
6-methylthio-carbazole-4-acetic acid;
6-benzyloxy-carbazole-1-acetic acid;
6-cyano-carbazole-2-acetic acid;
6-carboxy-carbazole-3-acetic acid;
6-ethyl-carbazole-4-acetic acid;
6,7-methylenedioxy-carbazole-1-acetic acid;
6-acetyl-carbazole-2-acetic acid;
6-iodo-carbazole-3-acetic acid;
6-chloro-carbazole-4-acetic acid dimethylamino ester;
6,9-dimethyl-carbazole-1-acetic acid;
6-chloro-carbazole-2-acetic acid dimethylaminoethyl ester hydrochloride;
6-chloro-N,N-dimethyl-carbazole-3-acetamide;
6-methyl-carbazole-4-acetic acid ethyl ester;
6-hydroxy-carbazole-1-acetic acid;
6-dimethylsulfamoyl-carbazole-4-acetic acid;
6-methylthio-carbazole-1-acetic acid;
6-benzyloxy-carbazole-2-acetic acid;
6-cyano-carbazole-3-acetic acid;
6-carboxy-carbazole-4-acetic acid;
6-ethyl-carbazole-1-acetic acid;
6,7-methylenedioxy-carbazole-2-acetic acid;
6-acetyl-carbazole-3-acetic acid;
6-iodo-carbazole-4-acetic acid;
6-chloro-carbazole-1-acetic acid dimethylamino ester;
6,9-dimethyl-carbazole-2-acetic acid;
6-chloro-carbazole-3-acetic acid dimethylamino ethyl ester hydrochloride;
6-chloro-N,N-dimethyl-carbazole-4-acetamide;

6-methyl-carbazole-1-acetic acid ethyl ester;
6-hydroxy-carbazole-2-acetic acid;
7-chloro-carbazole-2-acetic acid ethyl ester;
8-chloro-carbazole-2-acetic acid ethyl ester;
6-bromo-carbazole-2-acetic acid ethyl ester;
6-methyl-carbazole-2-acetic acid ethyl ester;
7-chloro-carbazole-3-acetic acid ethyl ester;
6-chloro-9-benzyl-carbazole-2-acetic acid ethyl ester;
6-chloro-9-methyl-carbazole-2-acetic acid ethyl ester;
6-chloro-α,9-dimethyl-carbazole-2-acetic acid ethyl ester;
6-acetamidocarbazole-2-acetic acid ethyl ester;
6-methyl-9-benzyl-carbazole-1-acetic acid ethyl ester;
6-chloro-9-methyl-carbazole-1-acetic acid ethyl ester;
6-chloro-carbazole-2-propionic acid ethyl ester;
6-chloro-α,α-dimethyl-carbazole-2-acetic acid ethyl ester;
6-chloro-carbazole-1-acetic acid ethyl ester;
6-chloro-carbazole-4-acetic acid ethyl ester;
6-trifluoromethyl-carbazole-2-acetic acid ethyl ester;
7,8-dichloro-carbazole-2-acetic acid ethyl ester;
5,6-dichloro-carbazole-2-acetic acid ethyl ester;
6-methylthio-carbazole-2-acetic acid ethyl ester;
6-carbethoxy-carbazole-2-acetic acid ethyl ester;
6-fluoro-carbazole-2-acetic acid ethyl ester;
α-methyl-carbazole-2-acetic acid ethyl ester;
α-methyl-carbazole-3-acetic acid ethyl ester;
6-N,N-dimethylsulfamoyl-carbazole-2-acetic acid ethyl ester;
6-cyano-carbazole-2-acetic acid ethyl ester;
6,7-dichloro-carbazole-2-acetic acid ethyl ester;
6-nitro-carbazole-2-acetic acid ethyl ester; and the like.

The preparation of the compounds of formula I is exemplified as hereinafter described.

A hydrazine of the formula

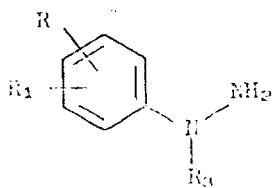

II wherein R, $R_1$ and $R_3$ are are previously described, is reacted with a cyclohexanone of the formula

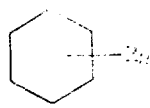

III wherein $R_2$ is as previously described, to yield a compound of the formula

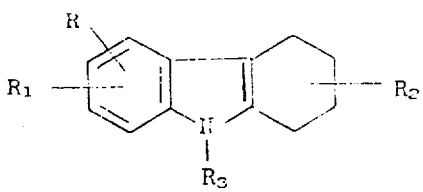

IV wherein R, $R_1$, $R_2$ and $R_3$ are as previously described. The compounds of formulas II and III are known compounds or can be prepared according to known procedures.

The reaction of the hydrazine of formula II with the cyclohexanone of formula III to yield the corresponding 1,2,3,4-tetrahydrocarbazole of formula IV is carried out at a temperature in the range of from about room temperature to about the reflux temperature of the reaction mixture; preferably, it is carried out at the reflux temperature of the reaction mixture. The reaction is effected in the presence of a solvent, for example, water, a lower alkanol, such as methanol, ethanol or the like, acetic acid, formic acid, hexane, dioxane, benzene, toluene, dimethylformamide and the like, and an acidic condensing agent as used in the Fischer Indole synthesis, for example, hydrochloric acid, sulfuric acid, phosphoric acid, zinc chloride, copper chloride, boron trifluoride and the like, and various combinations thereof. The molar ratio of the reactants is not critical. Preferably, the reactants are utilized in a 1:1 molar ratio. Alternatively, the reaction of the hydrazine of formula II with the cyclohexanone of formula III can be effected by thermal cyclization with or without solvent. Conveniently, such cyclization is effected at an elevated temperature, for example, at a temperature in the range of from about 80°C. to about 200°C. The compound of formula IV can be separated from the reaction mixture by known procedures. If desired, however, the reaction mixture may be utilized in the next step without further separation.

The 1,2,3,4-tetrahydrocarbazole of formula IV is then aromatized to the corresponding compound of formula I.

The compound of formula IV is converted to the compound of formula I utilizing an aromatizing agent, for example, p-chloranil, o-chloranil, 2,3-dichloro-5,6-dicyanobenzoquinone (DDQ), sulfur, palladium or carbon, lead oxide, and the like, in the presence of a solvent, for example, xylene, benzene, toluene, quinoline, dimethylsulfoxide (DMSO), dimethylformamide (DMF). The aromatization is carried out at a temperature in the range of from about room temperature to about the reflux temperature of the reaction mixture; preferably, it is carried out at the reflux temperature of the reaction mixture. The compound of formula I can be separated from the reaction mixture by known procedures, included among which are, for example, filtration, cyclization, distillation and the like.

Alternatively, an acid of formula I, prepared from the corresponding ketone of formula III, wherein $R_2$ is carboxy, can be converted to the corresponding ester by known procedures. For instance, (a) an acid of formula I can be reacted with an alkanol such as methanol, ethanol, propanol or the like, in the presence of an acid catalyst, for example, a hydrohalic acid such as hydrochloric acid, hydrobromic acid or the like, at a temperature in the range of from about room temperature to the reflux temperature of the reaction mixture, or (b) an alkali metal salt of an acid of formula I, such as the sodium salt, can be reacted with a substituted or unsubstituted alkyl halide utilizing known reaction conditions, for example, in an inert solvent such as benzene, toluene, dimethylformamide or the like, at a temperature in the range of from about room temperature to the reflux temperature of the reaction mixture.

An acid of formula I, wherein $R_3$ is hydrogen, can be acylated on the indole nitrogen utilizing the following reaction sequence. The acid is treated with 1,1-carbonyl-diimidazole and a solvent such as tetrahydrofuran or the like, at a temperature in the range of from about room temperature to the reflux temperature of the reaction mixture. The resulting product is then treated with t-butyl alcohol in the presence of a catalytic amount of sodium t-butoxide. Then, the resulting t-butyl ester is treated with an organic acid halide or organic anhydride, for example, an alkanoic acid such as acetic acid halide or an alkanoic anhydride such as acetic anhydride, utilizing known reaction conditions, for example, at a temperature in the range of from about room temperature to the reflux temperature of the reaction mixture, whereby the corresponding N-acylated ester is obtained. Pyrrolysis of the t-butyl ester neat or an inert high boiling solvent such as mineral oil or the like, at or about 160°C. until the evolution of gas ceases gives the corresponding N-acylated acid.

An ester of formula I, wherein $R_3$ is hydrogen, can also be acylated on the indole nitrogen utilizing known procedures, for example, by reaction with ethyl chloroacetate, in an inert organic solvent such as dimethylformamide, in the presence of an alkali metal carbonate such as potassium carbonate or by reacting the alkali metal salt of the indole nitrogen prepared in the usual manner, for example with sodium hydride or sodium amide in an inert solvent with ethyl chlorocarbonate, in DMF.

A compound of formula I, wherein R or $R_1$ is amino, can be converted to the corresponding compound wherein R or $R_1$ is dialkylamino, utilizing known procedures, for example, utilizing hydrogen at a pressure of from about 1 atmosphere to about several atmospheres and a catalyst such as Raney nickel, together with an alkyl aldehyde such as formaldehyde, at a temperature in the range of from about room temperature to about 100°, in a solvent, for example, an alkanol such as methanol, ethanol, or the like.

A compound of formula I, wherein R, $R_1$ and $R_2$ is alkoxyalkyl, can be converted to the corresponding compound, wherein R, $R_1$ or $R_2$ is hydroxy, by known procedures. For example, a compound of formula I bearing an alkoxy group can be treated with a mineral acid, for example, a hydrohalic acid such as hydrobromic acid, or the like, in a solvent, for example, alkanols such as ethanol, propanol, or the like, at a temperature in the range of from about room temperature to about the reflux temperature of the reaction mixture. The conversion can also be effected utilizing a Lewis acid, such as aluminum tribromide, boron trifluoride, tin tetrachloride or the like, in a solvent such as benzene, toluene, dimethylformamide or the like.

An alcohol of formula I, i.e., an alcohol prepared from the corresponding ketone of formula III, wherein A is hydroxy, can be converted to the corresponding compound of formula I wherein A is lower alkoxy, amino-lower alkoxy, mono-lower alkylamino-lower alkoxy or di-lower alkylamino-lower alkoxy by known procedures. For example, an alcohol of formula I, wherein A is hydroxy, is treated with an alkali metal such as sodium. The resulting compound is then treated with a halide (X) of the formula RX, wherein R is lower alkyl, amino-lower alkyl, mono-lower alkylamino-lower alkyl or di-lower alkylamino-lower alkyl, utilizing known reaction conditions.

A compound of formula I, wherein B is lower alkoxy, can be deesterified to the corresponding compound of formula I wherein B is hydroxy, with an alkali hydroxide, such as sodium hydroxide, potassium hydroxide or the like, in the presence of a solvent, for example, an alkanol such as methanol, ethanol or the like. The deesterification can be carried out at a temperature in the range of from about room temperature to about the reflux temperature of the reaction mixture; preferably it is carried out at the reflux temperature of the reaction mixture. The compound of formula I can be separated from the reaction mixture by known procedures.

An ester of formula I can be converted to the corresponding alcohol, e.g., wherein A is hydroxy or R and/or $R_1$ is carbolower alkoxy, by known procedures. For example, an ester of formula I can be treated with a reagent such as lithium aluminum hydride, at a temperature in the range of from about room temperature to the reflux temperature of the reaction mixture. Thereafter, the corresponding alcohol which is formed can be separated by known procedures.

A compound of formula I, wherein $R_1$ is acylamido, can be converted to the corresponding compound of formula I, wherein $R_1$ is amino by treatment with an inorganic acid, for example, a hydrohalic acid such as hydrochloric acid or the like, utilizing known reaction conditions.

The acids of formula I, i.e., the compounds of formula I, wherein B is hydroxy, and salts of such acids with bases, can be converted to a compound of formula I wherein B is amino-lower alkoxy, mono-lower alkylamino-lower alkoxy or di-lower alkylaminolower alkoxy by known procedures. For example, a salt of an acid of formula I is reacted with an amino-lower alkyl halide, monolower alkylamino-lower halide or di-lower alkylaminolower alkyl halide, exemplary of which are aminoethyl chloride, methylamino-ethyl bromide, diethylaminoethyl chloride and the like, to yield the desired end product. The temperature at which the reaction is effected is not critical; conveniently, the reaction is carried out at a temperature in the range of from about room temperature and about the reflux temperature of the reaction mixture. Conveniently, the reaction can be carried out in a polar solvent, such as dimethylformamide, dimethylsulfoxide or the like. The molar ratio of reactants is not critical. Preferably, the reactants are utilized in a 1:1 molar ratio.

Exemplary of the compounds of formula II, utilizing as reactants in the process of the invention, are:
p-chlorophenylhydrazine;
m-chlorophenylhydrazine;
o-chlorophenylhydrazine;
p-fluorophenylhydrazine;
p-bromophenylhydrazine;
3,4-dichlorophenylhydrazine;
p-trifluoromethylphenylhydrazine;
4-chloro-1-methylphenylhydrazine;
2,3-dichlorophenylhydrazine;
p-methylphenylhydrazine;
m-methylphenylhydrazine;
p-methoxyphenylhydrazine;
$N^1$-(4-chlorobenzyl)-p-chlorophenylhydrazine;
p-nitrophenylhydrazine;
1-methyl-1-phenylhydrazine;
p-sulfamidophenylhydrazine;

p-(difluoromethylsulfonyl)-phenylhydrazine;
p-carbethoxyphenylhydrazine;
4-aminosulfonyl-3-chlorophenylhydrazine; and the like.

The compounds of formula II are known compounds or can be prepared in an analogous manner to the known compounds.

Exemplary of the compounds of formula III, utilized as reactants in the process of the invention, are:

α-methyl-1-oxo-cyclohexane-acetic acid;
α-methyl-2-oxo-cyclohexane-acetic acid;
α-methyl-3-oxo-cyclohexane-acetic acid;
α-methyl-4-oxo-cyclohexane-acetic acid;
1-oxo-cyclohexane-acetic acid;
2-oxo-cyclohexane-acetic acid
3-oxo-cyclohexane-acetic acid;
4-oxo-cyclohexane-acetic acid;
α-methyl-1-oxo-cyclohexane-acetic acid ethyl ester;
α-methyl-1-oxo-cyclohexane-acetic acid methyl ester;
1-oxo-cyclohexane-acetic acid ethyl ester;
1-oxo-cyclohexane-acetic acid methyl ester; and the like.

The compounds of formula III are known compounds or can be prepared in an analogous manner to the known compounds.

Exemplary of the compounds of formula IV, utilized as reactants in the processes of the invention, are:

6-chloro-1,2,3,4-tetrahydrocarbazole-2-acetic acid;
6-chloro-1,2,3,4-tetrahydrocarbazole-1-acetic acid;
6-chloro-1,2,3,4-tetrahydrocarbazole-2-acetic acid ethyl ester;
6-methyl-1,2,3,4-tetrahydrocarbazole-3-acetic acid;
6-methoxy-1,2,3,4-tetrahydrocarbazole-2-acetic acid;
6-methoxy-1,2,3,4-tetrahydrocarbazole-4-acetic acid;
6-cyloro-α-methyl-1,2,3,4-tetrahydrocarbazole-2-acetic acid;
6-chloro-α-methyl-1,2,3,4-tetrahydrocarbazole-1-acetic acid ethyl ester;
9-(4-chlorobenzyl)-6-methoxy-1,2,3,4-tetrahydrocarbazole-2-acetic acid;
6-nitro-1,2,3,4-tetrahydrocarbazole-2-acetic acid;
6-nitro-1,2,3,4-tetrahydrocarbazole-1-acetic acid;
7-chloro-1,2,3,4-tetrahydrocarbazole-2-acetic acid;
7-chloro-1,2,3,4-tetrahydrocarbazole-3-acetic acid;
7-methyl-1,2,3,4-tetrahydrocarbazole-2-acetic acid;
8-chloro-1,2,3,4-tetrahydrocarbazole-4-acetic acid methyl ester;
8-chloro-1,2,3,4-tetrahydrocarbazole-2-acetic acid;
6-fluoro-α-methyl-1,2,3,4-tetrahydrocarbazole-2-acetic acid;
6-bromo-1,2,3,4-tetrahydrocarbazole-2-acetic acid;
6,7-dichloro-1,2,3,4-tetrahydrocarbazole-3-acetic acid;
5,6-dichloro-1,2,3,4-tetrahydrocarbazole-2-acetic acid;
6-trifluoromethyl-1,2,3,4-tetrahydrocarbazole-2-acetic acid;
6-methyl-α-methyl-1,2,3,4-tetrahydrocarbazole-1-acetic acid;
6-chloro-7-methyl-1,2,3,4-tetrahydrocarbazole-2-acetic acid;
6-chloro-5-methyl-1,2,3,4-tetrahydrocarbazole-2-acetic acid;
9-methyl-α-methyl-1,2,3,4-tetrahydrocarbazole-2-acetic acid;
7,8-dichloro-1,2,3,4-tetrahydrocarbazole-3-acetic acid;
1,2,3,4-tetrahydro-6-sulfamoylcarbazole-4-acetic acid;
6-difluoromethylsulfonyl-1,2,3,4-tetrahydrocarbazole-1-acetic acid;
6-carbethoxy-1,2,3,4-tetrahydrocarbazole-2-acetic acid;
5-chloro-1,2,3,4-tetrahydro-6-sulfamylcarbazole-2-acetic acid;
6-carbethoxy-1,2,3,4-tetrahydrocarbazole-1-acetic acid;
6-chloro-9-(p-chlorobenzoyl)-1,2,3,4-tetrahydrocarbazole-2-acetic acid ethyl ester;
9-benzoyl-6-chloro-1,2,3,4-tetrahydrocarbazole-2-acetic acid;
6-dimethylsulfamoyl-1,2,3,4-tetrahydrocarbazole-2-acetic acid;
6-methylthio-α-methyl-1,2,3,4-tetrahydrocarbazole-2-acetic acid;
6-benzyloxy-1,2,3,4-tetrahydrocarbazole-2-acetic acid;
6-cyano-1,2,3,4-tetrahydrocarbazole-4-acetic acid;
6-carboxy-1,2,3,4-tetrahydrocarbazole-2-acetic acid;
6-ethyl-1,2,3,4-tetrahydrocarbazole-2-acetic acid;
6,7-methylenedioxy-1,2,3,4-tetrahydrocarbazole-2-acetic acid;
6-acetyl-1,2,3,4-tetrahydrocarbazole-1-acetic acid;
6-iodo-1,2,3,4-tetrahydrocarbazole-2-acetic acid;
6-chloro-α-methyl-1,2,3,4-tetrahydrocarbazole-2-acetic acid dimethylaminoethyl ester;
6,9-dimethyl-1,2,3,4-tetrahydrocarbazole-3-acetic acid;
6-chloro-1,2,3,4-tetrahydrocarbazole-2-acetic acid dimethylaminoethyl ester hydrochloride;
6-chloro-N,N-dimethyl-1,2,3,4-tetrahydrocarbazole-2-acetamide;
6-methyl-α-methyl-1,2,3,4-tetrahydrocarbazole-4-acetic acid ethyl ester;
6-hydroxy-1,2,3,4-tetrahydrocarbazole-2-acetic acid; and the like.

The compounds of formula IV, wherein $R_2$ is —$CH_2COOH$ at the 1-position can also be prepared as illustrated hereinbelow.

A compound of the formula

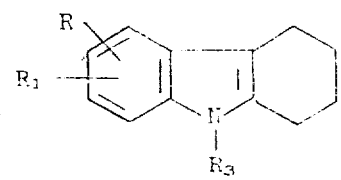

V wherein R, $R_1$ and $R_3$ are as previously described, is treated with freshly prepared N-halo-succinimide and pyridine in the presence of an inert organic solvent, for example, a hydrocarbon such as benzene or the like, and this reaction mixture is treated with a dialkylmalonate in the presence of an alkaline carbonate such as potassium carbonate, to yield a compound of the formula

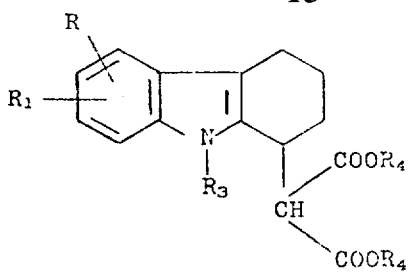

VI wherein R, $R_1$ and $R_3$ are as previously described and $R_4$ is lower alkyl.

The compound of formula VI is then treated with an alkali metal hydroxide such as potassium hydroxide in the presence of alkanol such as ethanol or the like, at the reflux temperature of the reaction mixture to yield the malonic acid of the formula

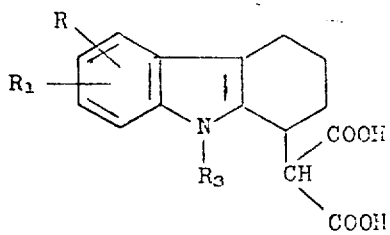

VII wherein R, $R_1$ and $R_3$ are as previously described.

Subsequently, the malonic acid of formula VII is heated neat or in the presence of an inert high boiling solvent such as mineral oil or the like, under an atmosphere of dry nitrogen to yield the acid of the formula

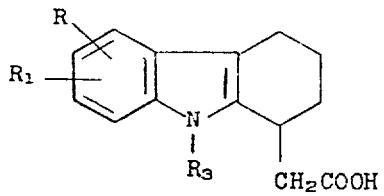

VIII wherein R, $R_1$ and $R_3$ are as previously described.

The compounds of formula I when R or $R_1$ is amino, monolower alkylamino, di-lower alkylamino, and/or when B or A is amino-lower alkoxy, mono-lower alkylamino-lower alkoxy or dilower alkylamino-lower alkoxy, form addition salts with pharmaceutically acceptable organic or inorganic acids such as hydrohalides, e.g., hydrochloride, hydrobromide, hydroiodide, other mineral acids salts such as sulfate, nitrate, phosphate and the like, alkyl- and mono-arylsulfonates such as ethanesulfonate, toluenesulfonate, benzenesulfonate, or the like, other organic acid salts such as acetate, tartrate, maleate, citrate, benzoate, salicylate, ascorbate and the like.

The compounds of formula I, when R or $R_1$ is carboxy and/or B is hydroxy or carboxy, form salts with pharmaceutically acceptable bases. Exemplary of such bases are alkali metal hydroxides, such as sodium hydroxide, potassium hydroxide, and the like; alkaline earth hydroxides, such as calcium hydroxide, barium hydroxide and the like; sodium alkoxides, such as sodium etholate, potassium etholate and the like; organic bases such as piperidine, diethanolamine, N-methylglucamine, and the like. Also included are the aluminum salts of the compounds of formula I, as above.

The compounds of formula I, including the salts of those compounds of formula I which form salts with pharmaceutically acceptable bases and acids, possess anti-inflammatory, analgesic and anti-rheumatic activity, and are therefore useful as antiinflammatory, analgesic and anti-rheumatic agents. The compounds of formula I also exhibit a signficantly low incidence of ulcerogenic activity, which renders them highly desirable as anti-inflammatory, analgesic and anti-rheumatic agents. Their pharmacologically useful activities are demonstrated in warmblooded animals using standard procedures.

For example, the anti-inflammatory activity is demonstrated in Albino rats of Hart Strain, weighing 125–155 gms. The test animals are given 10 mls. of vehicle[1], which contains the test compound per kg. of body weight. The animals are treated daily for 5 consecutive days. Three hours after the first treatment, 0.05 ml. of an 0.5 percent suspension of heat killed dessiccated Mycobacterium butyricum in U.S. P. olive oil, which has been steam sterilized for 30 minutes, is injected into the right hind foot of each rat. The paw volume is measured immediately after the injection of the adjuvant and again 96 hours later. The difference is recorded as volume of edema. The paw volume is measured by immersion of the paw into a column of mercury to an ink mark exactly at the level of lateral malleolus. Percent inhibition is calculated by dividing the average control edema minus the average treatment edema by the average control edema times 100. The percent inhibition is plotted against dose on semilogarithmic probability paper and the dose required to produce a 30 percent reduction in edema is estimated therefrom and is expressed as $ED_{30}$.

[1]Hilgar, A. G. and Hummel, D. J.: Endocrine Bioassay Data, No. 1, p. 15, August 1964 (Cancer Chemotherapy National Service Center, N.I.H.)

When 6-chloro-α-methyl-carbazole-2-acetic acid, which has demonstrated an $LD_{50}$ of, for example, 400 mg. p.o. in mice, is utilized as the test substance at a dosage of 0.03 mg. p.o., an anti-inflammatory acitivity is observed ($ED_{30}$=0.17).

The analgesic activity of the compounds of the invention is demonstrated, for example, employing the method which is a modification of that described by Eddy (1950), Wolfe and MacDonald (1944) and Eddy and Leimbach (1952). The method determines the reaction time of mice dropped onto a hot plate maintained at 55±0.5°C. Six groups of male mice (5 mice/group) weighing between 20–30 grams are utilized. The initial reaction time of these mice is determined once, and the reaction time of each group is then averaged. The mice are then administered the vehicle and/or the compound to be tested by the oral, intraperitoneal or subcutaneous route. The average reaction time of each group is determined again at 30, 60 and 90 minutes after compound administration and is compared to controls. Reaction time is recorded as percent changes from control. All groups are averaged before and after treatment. A combined reaction time average (recorded as percent change of reaction time threshhold from controls) for all three periods is plotted against dose on graph paper, and a curve is drawn. The $ED_{50}$ is read from this curve.

When 6-chloro-α-methyl-carbazole-2-acetic acid, which has demonstrated an $LD_{50}$ of, for example, 400 mg. p.o. in mice, is utilized as the test substance analgesic activity is observed at an $ED_{50}$ of 15.

The compounds of formula I, their enantiomers and salts thereof as herein described, have effects qualitatively similar to those of phenylbutazone and indomethacin, known for their therapeutic uses and properties. Thus, the end products of this invention demonstrate a pattern of activity associated with antiinflammatory agents of known efficacy and safety.

The compounds of formula I, their enantiomers and salts thereof as herein described, can be incorporated into standard pharmaceutical dosage forms, for example, they are useful for oral or patenteral application with the usual pharmaceutical adjuvant material, for example, organic or inorganic inert carrier materials such as water, gelatin, lactose, starch, magnesisum stearate, talc, vegetable oils, gums, polyalkyleneglycols, and the like. The pharmaceutical preparations can be employed in a solid form, for example, as tablets, troches, suppositories, capsules, or in liquid form, for example, as solutions, suspensions or emulsions. Pharmaceutical adjuvant materials can be added and include preservatives, stabilizers, wetting or emulsifying agents, salts to change the osmotic pressure or to act as buffers. The pharmaceutical preparations can also contain other therapeutically active substances.

Since the compounds of the invention when X and Y in formula I are different possess an asymmetric carbon atom, they are ordinarily obtained as racemic mixtures. The resolution of such racemates into the optically active isomers can be carried out by known procedures. Some racemic mixtures can be precipitated as eutectics and can thereafter be separated. Chemical resolution is, however, preferred. By this method, diastereomers are formed from the racemic mixture with an optically active resolving agent, for example, an optically active base, such as d-α-methylbenzylamine, which can be reacted with the carboxyl group. The formed diastereomers are separated by selective crystallization and converted to the corresponding optical isomer. Thus, the invention covers the racemates of the compounds of formula I as well as their optically active isomers.

Compounds of formula I wherein R, R₁ and R₃ are hydrogen and R₂ is

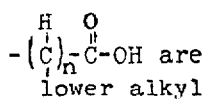
lower alkyl also, as already indicated, within the scope of the invention, and are characterized by the formula

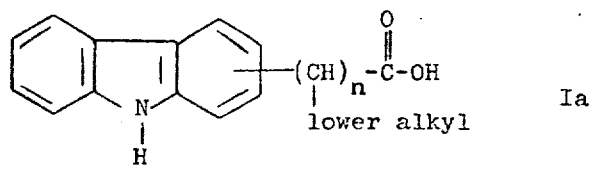
lower alkyl

Ia wherein $n$ is a previously described,
and include salts thereof with pharmaceutically acceptable bases. Such compounds are also useful as antiinflammatory, analgesic and anti-rheumatic agents, as demonstrated by the standard procedures described herein.

The following Examples further illustrate the invention. All parts are by weight and all temperatures are in °C., unless otherwise mentioned.

EXAMPLE 1

Preparation of α-methyl-3-oxocyclohexanemalonic acid diethyl ester

Two and two tenths g. of Na° metal was dissolved in 300 ml. of 2B ethanol in a 1 liter 3 neck round flask equipped with a $N_2$ gas inlet, thermometer and dropping funnel. Diethylmethylmalonate (182 g.) was added with stirring and the stirring continued for an hour. After this time, 92 g. of 2-cyclohexene-1-one in 118 ml. of ethanol was added slowly over the course of one hour. The stirring was continued for an additional 5 hours. The solution was then acidified with conc, acetic acid and the excess ethanol was removed on a rotating evaporator under vacuum. The residue was dissolved in ether (1200 ml.) was washed with water (3 × 200 ml.). The ether solution was dried over anhydrous $Na_2SO_4$ with stirring. After removal of the $Na_2SO_4$, the ether was removed on a Swisco. A residue of 308.7 g. of oil was obtained. This residue was distilled to yield 204.4 g. (78.7 percent) of α-methyl-3-oxocyclohexanemalonic acid diethyl ester as a clear oil, b.p. 149°–152°C. (0.8 mm), $n_D^{20}$ = 1.4660.

Analysis Calculated for $C_{14}H_{22}O_3$ (270.325)
C, 62.21; H, 8.20
Found: C, 62.32; H, 8.17
C, 62.26; H, 7.99

EXAMPLE 2

Preparation of α-methyl-3-oxocyclohexaneacetic acid

Fifteen and seventy-five one hundreth g. of α-methyl-3-oxocyclohexanemalonic acid diethyl ester, 235 ml. of 6N HCl and 235 ml. of dioxane were combined in a 1 liter flask equipped with a reflux condensor. The solution was heated to reflux with stirring and refluxed for 10 hours. After the solution had reached room temperature, a 50 percent solution of NaOH (75 gm. NaOH-75 ml. $H_2O$) was added until the solution was basic. The basic solution was then cooled with stirring in an ice bath before extracting it with ether (1 × 500 ml.). The ether layer was discarded and the aqueous layer was made acidic with concentrated HCl. The acidic solution was concentrated to dryness on a rotating evaporator and the salt remaining was triturated with ether (3 350 ml.). The ethane solution was dried over anhydrous $Na_2SO_4$ with stirring.

The drying agent was removed by filtration and the ether was concentrated to dryness on a rotating evaporator to yield 13.6 g. of an oil residue. The residual oil was distilled to yield 5.4 g. (54.9 percent) of α-methyl-3-oxocyclohexaneacetic acid, b.p. 164°–166° (0.7 mm.), $n_D^{20}$ = 1.4794.

Analysis Calculated for $C_9H_{14}O_3$ (170.208)
C, 63.51; H, 8.29
Found: C, 63.63; H, 8.42

EXAMPLE 3

Preparation of 6-chloro-α-methyl-1,2,3,4-tetrahydrocarbazole-2-acetic acid (diastereomers)

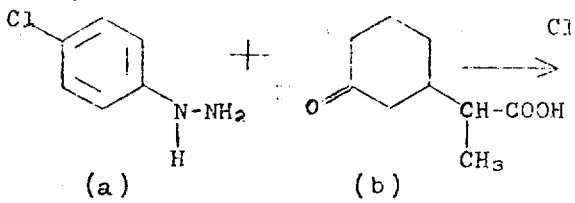 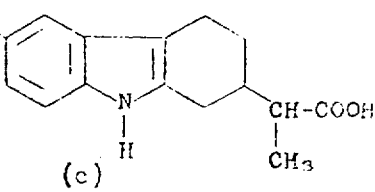

A mixture of 25 g. of p-chlorophenylhydrazine hydrochloride, 150 ml. of 80 percent acetic acid (120 ml. of glacial acetic plus 30 ml. of water) and 23.8 g. of α-methyl-3-oxocyclohexane acetic acid was stirred at ambient temperature under an atomsphere of nitrogen. After 1.5 hours, solution was complete and the reaction was heated to reflux. After 10 minutes at reflux, a heavy precipitate formed. Following an additional 0.5 hour under reflux, the heat was removed and the reaction mixture was stirred while cooling to room temperature. The contents of the reaction flask were poured into 2 liters of stirred water. The mixture was stirred for an additional 20 minutes and filtered. The filter cake was washed with water, allowed to dry and then completely dried in vacuum oven (95°C., over sodium hydroxide, water pump pressure); yield, 36.3 g. (93 percent) of 6-chloro-α-methyl-1,2,3,4-tetrahydrocarbazole-2-acetic acid, m.p. 193°-202° (mixture of diastereomers).

Analysis Calculated for $C_{15}H_{16}ClNO_2$ (277.76)
C, 64.86; H, 5.81; N, 5.04
Found: C, 64.82; H, 5.83; N, 4.78

In an analogous manner to Example 3, when the phenylhydrazine of formula (a) and/or the oxocyclohexane of formula (b) were replaced, as hereinafter set forth, the corresponding 1,2,3,4-tetrahydrocarbazoles were obtained:

substituting cyclohexanone-3-acetic acid for (b) there was obtained 6-chloro-1,2,3,4-tetrahydrocarbazole-2-acetic acid, m.p. 184°-186° (benzene);

substituting m-chlorophenylhydrazine for (a) and cyclohexanone-3-acetic acid for (b) there was otained 7-chloro-1,2,3,4-tetrahydrocarbazole-2-acetic acid, m.p. 189°-192° (EtOAc);

substituting o-chlorophenylhydrazine for (a) and cyclohexanone-3-acetic acid for (b) there was obtained 8-chloro-1,2,3,4-tetrahydrocarbazole-2-acetic acid;

substituting p-bromophenylhydrazine for (a) and cyclohexanone-3-acetic acid for (b) there was obtained 6-bromo-1,2,3,4-tetrahydrocarbazaole-2-acetic acid, m.p. 191°-201° (EtOAc);

substituting p-methylphenylhydrazine for (a) and cyclohexanone-3-acetic acid for (b) there was obtained 6-methyl-1,2,3,4-tetrahydrocarbazole-2-acetic acid, m.p. 184°°-186° (EtOAc);

substituting p-methoxyphenylhydrazine for (a) and cyclohexanone-3-acetic acid for (b) there was obtained 6-methoxy-1,2,3,4-tetrahydrocarbazole-2-acetic acid, m.p. 187°-188° (EtOAc);

substituting cyclohexanone-4-acetic acid for (b) there was obtained 6-chloro-1,2,3,4-tetrahydrocarbazole-3-acetic acid, m.p. 186°-188° (EtOAc);

substituting n-chlorophenylhydrazine for (a) and cyclohexanone-4-carboxylic acid for (b) there was obtained 7-chloro-1,2,3,4-tetrahydrocarbazole-3-acetic acid, m.p. 186°-188° (Hexane/EtOAc);

substituting 1-methyl-1-p-chlorophenylhydrazine for (a) and cyclohexanone-3-acetic acid for (b) there was obtained 6-chloro-9-methyl-1,2,3,4-tetrahydrocarbazole-2-acetic acid, m.p. 202°-204° (EtOAc);

substituting 1-methyl-1-p-chlorophenylhydrazine for (a) there was obtained 6-chloro-α, 9-dimethyl-1,2,3,4-tetrahydrocarbazole-2-acetic acid (diastereomers), m.p. 197°-203° (EtOAc);

substituting 1-benzyl-1-p-methylphenylhydrazine for (a) and cyclohexanone-1-acetic acid ethyl ester for (b) there was obtained 6-methyl-9-benzyl-1,2,3,4-tetrahydrocarbazole-1-acetic acid ethyl ester;

substituting 1-methyl-1-p-chlorophenylhydrazine for (a) and cyclohexanone-1-acetic acid ethyl ester for (b) there was obtained 6-chloro-9-methyl-1,2,3,4-tetrahydrocarbazole-1-acetic acid ethyl ester;

substituting p-dimethylsulfamoylphenylhydrazine for (a) and cyclohexanone-3-acetic acid for (b), there was obtained 1,2,3,4-tetrahydro-6-dimethylsulfamoylcarbazole-2-acetic acid, m.p. 159°-161° (EtOAc);

substituting p-cyanophenylhydrazine for (a) and cyclohexanone-3-acetic acid for (b), there was obtained 6-cycano-1,2,3,4-tetrahydrocarbazole-2-acetic acid;

substituting 3,4-dichlorophenylhydrazine for (a) and cyclohexanone-3-acetic acid for (b), there was obtained 6,7-dichloro-1,2,3,4-tetrahydrocarbazole-2-acetic acid m.p. 192-193° (EtOAc);

substituting p-nitrophenylhydrazine for (a) and cyclohexanone-3-acetic acid for (b), there was obtained 6-nitro-1,2,3,4-tetrahydrocarbazole-2-acetic acid, m.p. 233°-234° (MeOH);

substituting phenylhydrazine for (a) there was obtained α-methyl-1,2,3,4-tetrahydrocarbazole-2-acetic acid;

substituting phenylhydrazine for (a) and α-methyl-4-oxocyclohexane acetic acid for (b), there was obtained α-methyl-1,2,3,4-tetrahydrocarbazole-3-acetic acid;

substituting cyclohexanone-3-acetic acid for (b) there was obtained 6-chlooro-1,2,3,4-tetrahydrocarbazole-4-acetic acid, m.p. 162.5°-163.5° (benzene);

substituting p-trifluoromethylphenylhydrazine for (a) and cyclohexanone-3-acetic acid for (b), there was obtained 6-trifluoromethyl-1,2,3,4-tetrahydrocarbazole-2-acetic acid, m.p. 186°-187° (EtOH/H₂O);

substituting 2,3-dichlorophenylhydrazine for (a) and cyclohexanone-3-acetic acid for (b), there was obtained, 7,8-dichloro-1,2,3,4-tetrahydrocarbazole-2-acetic acid, m.p. 167°-169° (benzene);

substituting 3,4-dichlorophenylhydrazine for (a) and cyclohexanone-3-acetic acid for (b), there was obtained 5,6-dichloro-1,2,3,4-tetrahydrocarbazole-2-acetic acid, m.p. 194°-196° (acetonitrile);

substituting p-methylthiophenylhydrazine for (a) and cyclohexanone-3-acetic acid for (b), there was obtained 1,2,3,4-tetrahydro-6-methylthiocarbazole-2-acetic acid, m.p. 204°-205° (EtOAc);

substituting p-carboxyphenylhydrazine for (a) and cyclohexanone-3-acetic acid for (b), there was obtained 6-carboxy-1,2,3,4-tetrahydrocarbazole-2-acetic acid, m.p. 306°–307° (EtOH);

substituting p-fluorophenylhydrazine for (a) and cyclohexanone-2-acetic acid for (b), there was obtained 6-fluoro-1,2,3,4-tetrahydrocarbazole-2-acetic acid, m.p. 189°–190° (EtOAc);

substituting α,α-dimethyl-3-oxocyclohexane acetic acid for (b), there was obtained 6-chloro-α,α-dimethyl-1,2,3,4-tetrahydrocarbazole-2-acetic acid, m.p. 242°–243° (EtOAc);

substituting p-acetamidophenylhydrazine for (a) and cyclohexanone-3-acetic acid for (b), there was obtained 6-acetamido-1,2,3,4-tetrahydrocarbazole-2-acetic acid;

substituting 1-ethyl-1-parachlorophenylhydrazine for (a) and cyclohexanone-2-acetic acid for (b), there was obtained 6-chloro-9-ethyl-1,2,3,4-tetrahydrocarbazole-1-acetic acid;

substituting cyclohexanone-3-propionic acid for (b), there was obtained 6-chloro-1,2,3,4-tetrahydrocarbazole-2-propionic acid, m.p. 211°–212° (EtOAc).

EXAMPLE 4

Preparation of 6-chloro-α-methyl-1,2,3,4-tetrahydrocarbazole-2-acetic acid ethyl ester (diastersomers)

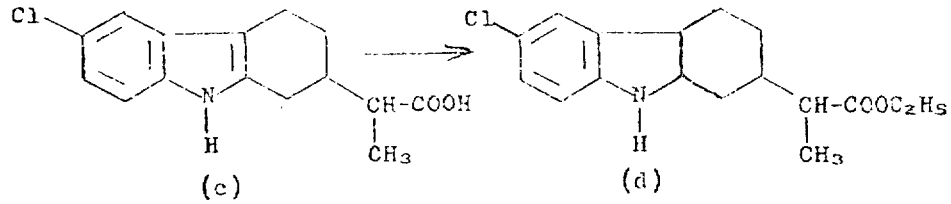

Thirty-six grams of 6-chloro-α-methyl-1,2,3,4-tetrahydrocarbazole-2-acetic acid (diastereomers) was dissolved in 1500 ml. of ehtanol. The slightly turbid solution was filtered through a celite mat and 10 g. of hydrogen chloride (gas) was added to the clear filtrate. The solution was refluxed under an atmosphere of nitrogen for 12 hours and allowed to remain at room temperature for 48 hours. Benzene (100 ml.) was added and the reaction mixture was concentrated under reduced pressure to dryness. The residue was dissolved in 1 liter of ethanol, 11 g. of hydrogen chloride (gas) was added and the solution was again refluxed. Following 12 hours at reflux, heating was stopped and 200 ml. of benzene was added. Thereafter, the reaction mixture was concentrated to dryness. The residue was dissolved in 800 ml. of ether (a faint turbidity remained) and extracted with 200 ml. of cold 2N sodium hydroxide. After the ether solution had been washed by extraction with water, it was dried over powdered anhydrous magnesium sulfate. Following filtration of the desiccant and evaporation of the ether, a gummy solid remained. Yield 35.9 g. (91.2 percent theory) of 6-chloro-α-methyl-1,2,3,4-tetrahydrocarbazole-2-acetic acid ethyl ester.

In an analogous manner to Example 4, when the 1,2,3,4-tetrahydrocarbazole of formula (c) is replaced as hereinafter set forth, the corresponding carbazoles are obtained:

substituting 6-chloro-1,2,3,4-tetrahydrocarbazole-2-acetic acid for (c), there was obtained 6-chloro-1,2,3,4-tetrahydrocarbazole-2-acetic acid ethyl ester, m.p. 125°–126° (EtoH);

substituting 1,2,3,4-tetrahydro-6-dimethylsulfamoylcarbazole-2-acetic acid for (c), there is obtained 1,2,3,4-tetrahydro-6-dimethylsulfamoylcarbazole-2-acetic acid ethyl ester;

substituting 6-cyano-1,2,3,4-tetrahydrocarbazole-2-acetic acid for (c), there was obtained 6-cyano-1,2,3,4-tetrahydrocarbazole-2-acetic acid ethyl ester, 159°–160° (benzene);

substituting 6,7-dichloro-1,2,3,4-tetrahydrocarbazole-2-acetic acid for (c), there is obtained 6,7-dichloro-1,2,3,4-tetrahydrocarbazole-2-acetic acid ethyl ester;

substituting 6-nitro-1,2,3,4-tetrahydrocarbazole-2-acetic acid for (c), there is obtained 6-nitro-1,2,3,4-tetrahydrocarbazole-2-acetic acid ethyl ester;

substituting α-methyl-1,2,3,4-tetrahydrocarbazole-2-acetic acid for (c), there is obtained α-methyl-1,2,3,4-tetrahydrocarbazole-2-acetic acid ethyl ester;

substituting 1,2,3,4-tetrahydro-6-methylthiocarbazole-2-acetic acid for (c), there is obtained 1,2,3,4-tetrahydro-6-methylthiocarbazole-2-acetic acid ethyl ester;

substituting 6-carboxy-1,2,3,4-tetrahydrocarbazole-2-acetic acid for (c), there is obtained 6-carboxy-1,2,3,4-tetrahydrocarbazole-2-acetic acid ethyl ester;

substituting 6-fluoro-1,2,3,4-tetrahydrocarbazole-2-acetic acid for (c), there is obtained 6-fluoro-1,2,3,4-tetrahydrocarbazole-2-acetic acid ethyl ester;

substituting 6-chloro-α,α-dimethyl-1,2,3,4-tetrahydrocarbazole-2-acetic acid for (c), there is obtained 6-chloro-α3α-dimethyl-1,2,3,4-tetrahydrocarbazole-2-acetic acid ethyl ester;

substituting 6-acetamido-1,2,3,4-tetrahydrocarbazole-2-acetic acid for (c), there was obtained 6-acetamido-1,2,3,4-tetrahydrocarbazole-2-acetic acid ethyl ester, 169°–171° (EtOAc);

substituting α-methyl-1,2,3,4-tetrahydrocarbazole-3-acetic acid for (c) there is obtained α-methyl-1,2,3,4-tetrahydrocarbazole-3-acetic acid ethyl ester;

substituting 6-chloro-1,2,3,4-tetrahydrocarbazole-4-acetic acid for (c), there is obtained 6-chloro-1,2,3,4-tetrahydrocarbazole-4-acetic acid ethyl ester;

substituting 6-trifluoromethyl-1,2,3,4-tetrahydrocarbazole-2-acetic acid for (c), there is obtained 6-trifluoromethyl-1,2,3,4-tetrahydrocarbazole-2-acetic acid ethyl ester;

substituting 7,8-dichloro-1,2,3,4-tetrahydrocarbazole-2-acetic acid for (c), there is obtained 7,8-dichloro-1,2,3,4-tetrahydrocarbazole-2-acetic acid ethyl ester;

substituting 5,6-dichloro-1,2,3,4-tetrahydrocarbazole-2-acetic acid for (c), there is obtained 5,6-dichloro-1,2,3,4-tetrahydrocarbazole-2-acetic acid ethyl ester;

substituting 6-chloro-9-ethyl-1,2,3,4-tetrahydrocarbazole-1-acetic acid for (c), there is obtained 6-chloro-9-ethyl-1,2,3,4-tetrahydrocarbazole-1-acetic acid ethyl ester;

substituting 6-chloro-1,2,3,4-tetrahydrocarbazole-2- propionic acid for (c), there is obtained 6-chloro-1,2,3,4-tetrahydrocarbazole-2-propionic acid ethyl ester.

EXAMPLE 5

Preparation of 6-chloro-α-methylcarbazole-2-acetic acid ethylester

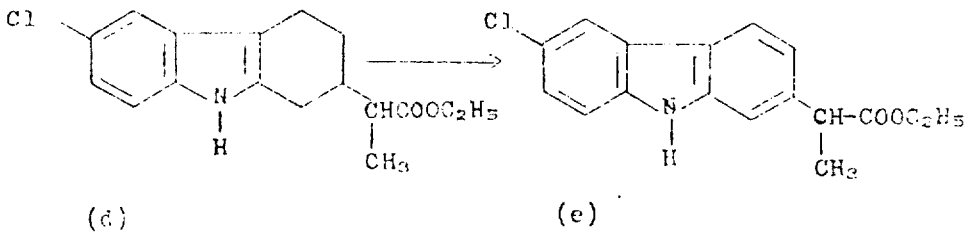

(d)                                    (e)

A mixture of 34.9 g. of 6-chloro-α-methyl-1,2,3,4-tetrahydrocarbazole-2-acetic acid ethyl ester (mixture of diastereomers), 350 ml. C.P. Xylene and 56.0 g. of p-chloranil was stirred and heated under an atmosphere of dry nitrogen. The reaction flask was wrapped in aluminum foil in order to keep out any extraneous light. After the reaction mixture had stirred at reflux temperature for 6 hours, heating and stirring were stopped and the reaction mixture was left overnight at room temperature. The supernatant liquid was decanted through a filter. The residue was triturated with 100 ml. of warm benzene and the supernatent liquid was decanted through a filter. This process was repeated 3 more times. Ether (300 ml.) was added to the combined filtrates. The solution was extracted with cold 2N sodium hydroxide (3 × 100 ml.), washed by extraction with water until neutral and dried over anhydrous magnesium sulfate. Following filtration of the desiccant and evaporation of the solvent, a residue of 35.5 g. remained. Crystallization from 50 ml. of methanol gave 14.8 g. of 6-chloro-α-methylcarbazole-2-acetic acid ethyl ester, m.p. 106°–107.5° (43.2 percent).

Analysis Calcd. for $C_{17}H_{16}ClNO_2$ (301.77)
C, 67.66; H, 5.35; N, 4.64
Found: C, 67.67; H, 5.55; N, 4.46

In an analogous manner to Example 5, when the 1,2,3,4-tetrahydrocarbazole of formula (d) was replaced as hereinafter set forth, the corresponding carbazoles were obtained:

substituting 6-chloro-1,2,3,4-tetrahydrocarbazole-2-acetic acid ethyl ester for (d), there was obtained 6-chlorocarbazole-2-acetic acid ethyl ester, m.p. 176–178° (MeOH);

substituting 7-chloro-1,2,3,4-tetrahydrocarbazole-2-acetic acid ethyl ester for (d), there was obtained 7-chlorocarbazole-2-acetic acid ethyl ester, m.p. 200°–202° (MeOH);

substituting 8-chloro-1,2,3,4-tetrahydrocarbazole-2-acetic acid ethyl ester for (d), there was obtained 8-chlorocarbazole-2-acetic acid ethyl ester, m.p. 110°–113° (MeOH);

substituting 6-acetamido-1,2,3,4-tetrahydrocarbazole-2-acetic acid ethyl ester for (d), there was obtained 6-acetamidocarbazole-2-acetic acid ethyl ester, m.p. 208°–210° (EtOH);

substituting 6-methyl-9-benzyl-1,2,3,4-tetrahydrocarbazole-1-acetic acid ethyl ester for (d), there was obtained 6-methyl-9-benzylcarbazole-1-acetic acid ethyl ester, m.p. 130°–131° (CH₃OH);

substituting 6-chloro-9-ethyl-1,2,3,4-tetrahydrocarbazole-1-acetic acid ethyl ester for (d), there is obtained 6-chloro-9-ethylcarbazole-1-acetic acid ethyl ester;

substituting 6-chloro-1,2,3,4-tetrahydrocarbazole-2-propionic acid ethyl ester for (d) there was obtained 6-chlorocarbazole-2-propionic acid ethyl ester, m.p. 149°–150.05° (MeOH);

substituting 6-chloro-α,α-dimethyl-1,2,3,4-tetrahydrocarbazole-2-acetic acid ethyl ester for (d), there is obtained 6-chloro-α,α-dimethylcarbazole-2-acetic acid ethyl ester;

substituting 6-chloro-1,2,3,4-tetrahydrocarbazole-1-acetic acid ethyl ester for (d), there was obtained 6-chlorocarbazole-1-acetic acid ethyl ester, m.p. 152.5°–154° (CH₃OH);

substituting 6-chloro-1,2,3,4-tetrahydrocarbazole-4-acetic acid ethyl ester for (d), there was obtained 6-chlorocarbazole-4-acetic acid ethyl ester, m.p. 154°–155° (MeOH);

substituting 6-trifluoromethyl-1,2,3,4-tetrahydrocarbazole-2-acetic acid ethyl ester for (d), there was obtained 6-trifluoromethylcarbazole-2-acetic acid ethyl ester, m.p. 130°–131° (CCl₄);

substituting 7,8-dichloro-1,2,3,4-tetrahydrocarbazole-2-acetic acid ethyl ester for (d), there was obtained 7,8-dichlorocarbazole-2-acetic acid ethyl ester, m.p. 154°–155° (MeOH);

substituting 5,6-dichloro-1,2,3,4-tetrahydrocarbazole-2-acetic acid ethyl ester for (d), there was obtained 5,6-dichlorocarbazole-2-acetic acid ethyl ester, m.p. 139°–140° (MeOH);

substituting 6-methylthio-1,2,3,4-tetrahydrocarbazole-2-acetic acid ethyl ester for (d), there is obtained 6-methylthiocarbazole-2-acetic acid ethyl ester;

substituting 6-carbethoxy-1,2,3,4-tetrahydrocarbazole-2-acetic acid ethyl ester for (d), there was obtained 6-carbethoxycarbazole-2-acetic acid ethyl ester, m.p. 141°–143° (MeOH);

substituting 6-fluoro-1,2,3,4-tetrahydrocarbazole-2-acetic acid ethyl ester for (d), there was obtained 6-fluorocarbazole-2-acetic acid ethyl ester, m.p. 178°–179° (MeOH);

substituting α-methyl-1,2,3,4-tetrahydrocarbazole-2-acetic acid ethyl ester for (d), there was obtained α-methylcarbazole-2-acetic acid ethyl ester, m.p. 104°–105° (hexane);

substituting α-methyl-1,2,3,4-tetrahydrocarbazole-3-acetic acid ethyl ester for (d), there was obtained α-methylcarbazole-3-acetic acid ethyl ester, m.p. 97.5°–99° (CH₃OH);

substituting 6-N,N-dimethylsulfamoyl-1,2,3,4-tetrahydrocarbazole-2-acetic acid ethyl ester for (d), there was obtained 6-N,N-dimethylsulfamoylcarbazole-2-acetic acid ethyl ester, m.p. 146°–147° (CH₃OH);

substituting 6-cyano-1,2,3,4-tetrahydrocarbazole-2-acetic acid ethyl ester for (d), there was obtained 6-cyanocarbazole-2-acetic acid ethyl ester, m.p. 157°–158° (CH₃OH);

substituting 6,7-dichloro-1,2,3,4-tetrahydrocarbazole-2-acetic acid ethyl ester for (d), there was obtained 6,7-dichlorocarbazole-2-acetic acid ethyl ester, m.p. 186°–187.5° (CH₃OH); and substituting 6-nitro-1,2,3,4-tetrahydrocarbazole-2-acetic acid ethyl ester for (d), there was obtained 6-nitrocarbazole-2-acetic acid ethyl ester, m.p. 164°–165° (CH₃OH).

EXAMPLE 6

Preparation of 6-chloro-α-methylcarbazole-2-acetic acid (racemic)

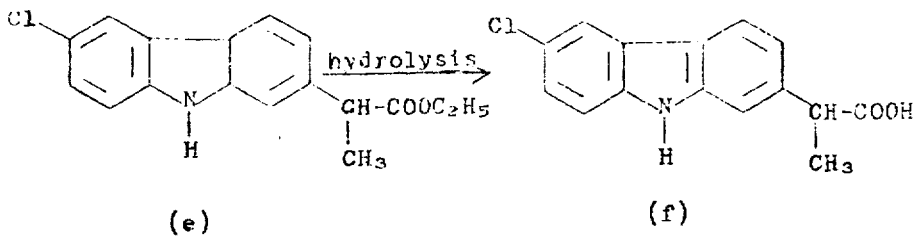

(e)                  (f)

A stirred mixture of 11 g. of 6-chloro-α-methylcarbazole-2-acetic acid ethyl ester, 100 ml. ethanol and 100 ml. of 3N sodium hydroxide was heated (N₂ atmosphere). After 2 hours at reflux, the reaction mixture was concentrated to dryness under reduced pressure. Water (300 ml.) and ice (200 g.) were added to the residue and concentrated hydrochloric acid was added until the mixture was strongly acid. The acidic mixture was extracted with ether (3 × 200 ml.). The ether extracts were combined, washed by extraction with water (3 × 100 ml.) and dried over anhydrous magnesium sulfate. Following filtration of the desiccant and evaporation of the solvent, a yield of 9.8 (98.2percent) was obtained. Crystallization from CHCl₃ yielded 6.2 g. (62.0%) of 6-chloro-α-methylcarbazole-2-acetic acid, m.p. 197°–198°. A second crop of 1.6 g., m.p. 195°–199° was obtained from the mother liquors.

Analysis calculated for C, 65.82; H, 4.44; N, 5.12
Found: C, 65.90; H, 4.70; N, 4.87

In an analogous manner of Example 6, when the carbazole of formula (c) was replaced as hereinafter set forth; the corresponding carbazoles of formula (f) were obtained:

substituting 6-chloro-carbazole-2-acetic acid ethyl ester for (e), there was obtained 6-chloro-carbazole-2-acetic acid, m.p. 255°–257° (EtOAc);

substituting 7-chloro-carbazole-2-acetic acid ethyl ester for (e), there was obtained 7-chloro-carbazole-2-acetic acid, m.p. 252°–254° (MeOH);

substituting 8-chloro-carbazole-2-acetic acid ethyl ester for (e), there was obtained 8-chloro-carbazole-2-acetic acid, m.p. 210°–211° (CHCl₃);

substituting 6-bromo-carbazole-2-acetic acid ethyl ester for (e), there was obtained 6-bromo-carbazole-2-acetic acid m.p. 249°–250° (MeOH);

substituting 6-methyl-carbazole-2-acetic acid ethyl ester for (e), there was obtained 6-methyl-carbazole-2-acetic acid, m.p. 272°–274° (decomp.) (EtOAc);

substituting 6-methoxy-carbazole-2-acetic acid ethyl ester for (e), there was obtained 6-methoxy-carbazole-2-acetic acid, m.p. 205°–206° (decomp.) (EtOAc);

substituting 6-methyl-9-benzyl-carbazole-1-acetic acid ethyl ester for (e), there was obtained 6-methyl-9-benzyl-carbazole-1-acetic acid, m.p. 182°–185° (CH₃OH);

substituting 6-chloro-9-methyl-carbazole-1-acetic acid ethyl ester for (e), there was obtained 6-chloro-9methylcarbazole-1-acetic acid, m.p. 223°–225° (EtOAc);

substituting 6-chloro-9-methyl-carbazole-2-acetic acid ethyl ester for (e), there was obtained 6-chloro-9-methyl-carbazole-2-acetic acid, m.p. 235°–236° (EtOAc);

substituting rac. 6-chloro-α,9-dimethyl-carbazole-2-acetic acid ethyl ester for (e), there was obtained rac. 6-chloro-α,9-dimethyl-carbazole-2-acetic acid, m.p. 176°–178° (benzene);

substituting 6-chloro-carbazole-3-acetic acid ethyl ester for (e), there was obtained 6-chloro-carbazole-3-acetic acid, m.p. 246°–247° (EtOAc);

substituting 7-chloro-carbazole-3-acetic acid ethyl ester for (e), there was obtained 7-chloro-carbazole-3-acetic acid, m.p. 235°–237° (EtOAc);

substituting 6-acetamidocarbazole-2-acetic acid ethyl ester for (e), there was obtained 6-acetamidocarbazole-2-acetic acid, m.p. 300° (EtOH);

substituting 6-methyl-9-benzylcarbazole-1-acetic acid ethyl ester for (e), there was obtained 6-methyl-9-benzylcarbazole-1-acetic acid, m.p. 182°–185° (CH₃OH);

substituting 6-chloro-9-ethylcarbazole-1-acetic acid ethyl ester for (e), there was obtained 6-chloro-9-ethylcarbazole-1-acetic acid, m.p. 192°–193° (MeOH);

substituting 6-chlorocarbazole-2-propionic acid ethyl ester for (e), there was obtained 6-chlorocarbazole-2-propionic acid, m.p. 230°–231° (MeOH);

substituting 6-chloro-α,α-dimethylcarbazole-2-acetic acid ethyl ester for (e), there was obtained 6-chloro-α,α-dimethylcarbazole-2-acetic acid, m.p. 221°–222.5° (EtOAc/hexane);

substituting 6-chlorocarbazole-1-acetic acid ethyl ester for (e), there was obtained 6-chloroacarbazole-1-acetic acid, m.p. 155°–157° (decomp.). Piperidine salt, m.p. 118°–120° (acetone/ether);

substituting 6-chlorocarbazole-4-acetic acid ethyl ester for (e), there was obtained 6-chlorocarbazole-4-acetic acid, m.p. 175°–176° (decomp.) (benzene);

substituting 6-methylthiocarbazole-2-acetic acid ethyl ester for (e), there was obtained 6-methylthiocarbazole-2-acetic acid, m.p. 202°–204° (EtOAc);

substituting 6-carboxycarbazole-2-acetic acid ethyl ester for (e), there was obtained 6-carboxycarbazole-2-acetic acid, m.p. 301°–302° (acetone);

substituting 6-chloro-9-carboxymethyl-α-methylcarbazole-2-acetic acid ethyl ester for (e), there was obtained 6-chloro-9-carboxymethyl-α-methylcarbazole-2-acetic acid, m.p. 248°–250° (decomp.) (acetone);

substituting α-methylcarbazole-2-acetic acid ethyl ester for (e), there was obtained α-methylcarbazole-2-acetic acid, m.p. 246°–247° (decomp.) (CHCl₃);

substituting α-methylcarbazole-3-acetic acid ethyl ester for (e), there was obtained α-methylcarbazole-3-acetic acid, m.p. 213°–216° (decomp.) (EtOAc);

substituting 6-nitrocarbazole-2-acetic acid ethyl ester for (e), there was obtained 6-nitrocarbazole-2-acetic acid, m.p. 262°–264° (CH₃OH); and substituting 6-chloro-9-ethoxycarbonylemthyl-α-methylcarbazole-2-acetic acid ethyl ester for (e), there was obtained 6-chloro-9-carboxymethyl-α-methylcarbazole-2-acetic acid, m.p. 248°–250° (acetone).

EXAMPLE 7

Preparation of (−) 6-chloro-α-methyl-carbazole-2-acetic acid

A solution of 8.0 g. of (+)-α-methylbenzylamine ([α]$_D^{20}$ + 39) in 40 ml. acetone was carefully added to a warmed solution of 18.0 g. of rac. 6-chloro-α-methyl-carbazole-2-acetic acid in 360 ml. of acetone. After standing at room temperature for 3 days, the mixture was filtered and the filter cake was washed with a small amount of cold acetone to yield upon drying 10.6 g. of (−) 6-chloro-α-methyl-carbazole-2-acetic acid (+) α-methylbenzylamine salt [α]$_D^{22}$ + 9.9° (the filtrate and washings were combined, concentrated to dryness and the free acid was liberated for use in further resolution). A recrystallization of the salt from 200 ml. of acetone gave 6.0 g. [α]$_D^{22}$ + 11.1°. Upon two additional recrystallizations of the salt, 1.85 g. was obtained, [α]$_D^{22}$ + 13.2°. Further recrystallization of the salt from acetone did not increase the specific rotation. The salt (1.85 g.) was dissolved in 50 ml. of warm methanol, filtered from any insolubles, and then poured into a stirred mixture of ice and hydrochloric acid. Following filtration and drying, 1.2 g. of the acid was obtained which yielded upon crystallization from chloroform 1.0 g. of (−) 6-chloro-α-methyl-carbazole-2-acetic acid, m.p. 198°–201°; [α]$_D^{22}$ − 53.0°. (C 1.4 CH$_3$OH)

EXAMPLE 8

Preparation of (+) 6-chloro-α-methyl-carbazole-2-acetic acid

A solution of 4.3 g. of (−) α-methylbenzylamine in 20 ml. of acetone was added to a solution of 9.7 g. of partially resolved 6-chloro-α-methyl-carbazole-2-acetic acid (recovered from the filtration of a previous resolution of the racemate). After standing at room temperature for 24 hours, the mixture was filtered and the filter cake was washed with cold acetone to yield after drying 7.3 g. Following two additional recrystallizations from acetone, 1.9 g. of (+) 6-chloro-α-methyl-carbazole-2-acetic acid (−) α-methylbenzylamine salt, [α]$_D^{22}$ − 13.6° was obtained. Further recrystallizations from acetone did not change the specific rotation. The salt was dissolved in 50 ml. of warm acetone and the solution after filtration was poured into 500 ml. of dilute hydrochloric acid. Following filtration and drying, 1.4 g. was obtained, which upon crystallization from chloroform gave 0.9 g. of (+) 6-chloro-α-methyl-carbazole-2-acetic acid, m.p. 198°–201°, [α]$_D^{22}$ + 53.2°, (c 1.33. CH$_3$OH).

EXAMPLE 9

Preparation of 6-chloro-α-methylcarbazole-2-acetic acid t-butyl ester

A solution of 2 g. of 6-chloro-α-methylcarbazole-2-acetic acid in 10 ml. of tetrahydrofuran was added dropwise to a stirred solution of 1.4 g. of 1,1-carbonyl diimidazole in 10 ml. of tetrahydrofuran. The stirred reaction mixture was heated to reflux. After the reaction had stirred at reflux temperature for 1 hour (carbon dioxide was given off by the reaction mixture), it was cooled to 25°C. and a solution of 0.5 g. of sodium-t-butoxide, 5 g. of t-butyl alcohol and 10 ml. of tetrahydrofuran was added dropwise over the course of 5 minutes. Following the last addition, the stirred reaction mixture was heated to reflux and maintained there for 4 hours. When the reaction had cooled to room temperature, it was concentrated to dryness under reduced pressure. The residue was partitioned between ether and 2N potassium carbonate. The ether layer was separated, washed by extraction with water and dried over anhydrous magnesium sulfate. Following filtration of the desiccant and evaporation of the ether, 2.2 g. was obtained. Crystallization from aqueous ethanol gave 1.7 g. of 6-chloro-α-methylcarbazole-2-acetic acid t-butyl ester, having a m.p. of 152°–154°.

Analysis Calcd. for C$_{19}$H$_{20}$ClNO$_2$ (M.W. 329.82)
C, 69.19; H, 6.11; N, 4.25
Found: C, 69.11, H, 6.19; N, 4.03

EXAMPLE 10

Preparation of 9-acetyl-6-chloro-α-methylcarbazole-2-acetic acid

A solution of 4 g. of 6-chloro-α-methylcarbazole-2-acetic acid tert. butyl ester, 70 ml. of chloroform, 3 ml. of acetic anhydride and 1 drop of concentrated sulfuric acid was stirred at reflux temperature for 3 hours. The reaction mixture was concentrated to dryness under reduced pressure, and the residue was partitioned between chloroform and dilute cold potassium bicarbonate. The chloroform layer was separated, washed by extraction with water and dried over magnesium sulfate. Following filtration of the desiccant and evaporation of the ether solution, 1.9 g. of the acetylated ester was obtained. The crude product without further purification was stirred and heated between 210°–220° under an atmosphere of dry nitrogen for 30 minutes. Upon cooling to room temperature, the reaction mixture was partitioned between ether and cold dilute potassium bicarbonate. The aqueous portion was separated and the ether was again extracted with cold dilute potassium bicarbonate. Ice was added to the combined potassium bicarbonate extracts and the solution was made slightly acidic with cold 6N hydrochloric acid. The acid that separated was removed by filtration, washed with cold water and air dried; yielding 0.7 g. Following recrystallization from ethyl acetate, 0.5 g. of 9-acetyl-6-chloro-α-methylcarbazole-2-acetic acid, having a m.p. of 180°–182° was obtained.

Analysis Calcd. for C$_{17}$H$_{14}$ClNO$_3$ (M.W. 315.75)
C, 64.66; H, 4.47; N, 4.44
Found: C, 64.61; H, 4.33; N, 4.40

EXAMPLE 11

Preparation of 6-acetamidocarbazole-2-acetic acid ethyl ester

A mixture of 1.8 g. of 6-acetamido-1,2,3,4-tetrahydrocarbazole-2-acetic acid ethyl ester, 0.3 g. of 10 percent palladium on carbon black and 30 ml. of dry xylene was refluxed and stirred under an atmosphere of dry nitrogen for 48 hours. The mixture was cooled to 70°, diluted with warm ethanol and filtered through celite. The filter cake was washed several times with warm ethanol. The filtrate and washings were combined and concentrated to dryness under reduced pressure; yielding 1.6 g. Upon crystallization from ethanol, 0.8 g. of 6-acetamidocarbazole-2-acetic acid ethyl ester, having a m.p. of 208–210° was obtained.

Analysis Calcd. for C$_{18}$H$_{18}$N$_2$O$_2$ (M.W. 310.34)
C, 69.66; H, 5.85; N, 9.03

Found: C, 69.35; H, 6.02; N, 8.76

EXAMPLE 12

Preparation of 6-aminocarbazole-2-acetic acid ethyl ester hydrochloride

A solution of 6-acetamidocarbazole-2-acetic acid ethyl ester and 40 ml. of 1N alcoholic hydrogen chloride was refluxed and stirred under an atmosphere of dry nitrogen for 6 hours. The solution was concentrated to dryness under reduced pressure and the residue was crystallized from a solution of ethyl acetate and ethanol; yielding 0.5 g. of 6-aminocarbazole-2-acetic acid ethyl esterhydrochloride, having a m.p. of 231°–232° (dec.).

Analysis Calcd. for $C_{16}H_{16}N_2O_2 \cdot HCl$ (M.W. 304.78)
C, 63.06; H, 5.62; N, 9.19
Found: C, 63.20; H, 5.65; N, 9.00

EXAMPLE 13

Preparation of 6-chloro-1,2,3,4-tetrahydrocarbazole-1-malonic acid diethyl ester To a stirred solution of 18.8 g. of 6-chloro-1,2,3,4-tetrahydrocarbazole, 20 g. of pyridine and 320 ml. of dry benzene was added over the course of 30 minutes 18.8 g. of freshly recrystallized N-bromosuccinimide. After the addition, the reaction mixture was stirred for 2.5 hours at room temperature and then stirred for 45 minutes at 60°C. After cooling to room temperature, the reaction mixture was concentrated to dryness under reduced pressure. To the stirred residue was added a solution of 42.5 g. of diethylmalonate in 265 ml. of anhydrous ethanol. The stirred mixture was cooled in an ice bath to 5°C. and 21.5 g. of anhydrous potassium carbonate was added slowly over 30 minutes. The reaction mixture was stirred an additional 16 hours at room temperature and glacial acetic accid was added slowly until the reaction mixture was slightly acidic. The mixture was then concentrated to dryness under reduced pressure and the residue was partitioned between ether and water. The organic layer was separated, washed by extraction with water four times and dried over anhydrous sodium sulfate. After the desiccant had been removed by filtration and the ether evaporated, the residue slowly crystallized. The supernatant liquor was decanted and the remaining crystals were dried on a porous plate to yield 8 g. of 6-chloro-1,2,3,4-tetrahydrocarbazole-1-malonic acid diethyl ester, having a m.p. of 142°–144°.

Analysis Calcd. for $C_{19}H_{22}ClNO_4$ (M.W. 363.84)
C, 62.72; H, 6.10; N, 3.85
Found: C, 62.68; H, 6.12; N, 4.10

EXAMPLE 14

Preparation of 6-chloro-1,2,3,4-tetrahydrocarbazole-1-malonic acid

A solution of 5 g. of 6-chloro-1,2,3,4-tetrahydrocarbazole-1-malonic acid diethyl ester, 8 g. of potassium hydroxide, 38 ml. of ethanol and 2 ml. of water was stirred and heated to reflux temperature under an atmosphere of nitrogen. After 2 hours of refluxing, the reaction mixture was concentrated to dryness under reduced pressure. The residue was dissolved in 1.5 liters of warm water and filtered through a celite filter pad. Concentrated hydrochloric acid was added to the cooled filtrate until precipitation was complete, and the mixture was extracted with ether. In turn, the ether extract was washed by extraction with water and dried over anhydrous magnesium sulfate. Following filtration of the desiccant and evaporation of the ether solution, 4.7 g. was obtained. A small portion was recrystallized from benzene to yield 6-chloro-1,2,3,4-tetrahydrocarbazole-1-malonic acid, having a m.p. of 159°–160° (dec.).

Analysis Calcd. for $C_{15}H_{14}ClNO_4$ (M.W. 307.73)
C, 58.54; H, 4.59; N, 4.55
Found: C, 58.57; H, 4.45; N, 4.45

EXAMPLE 15

Preparation of 6-chloro-1,2,3,4-tetrahydrocarbazole-1-acetic acid

Stirred anhydrous 6-chloro-1,2,3,4-tetrahydrocarbazole-1-malonic acid (4.3 g.) was heated under an atmosphere of dry nitrogen. The temperature was raised to 195° over 20 minutes and then held at 195° for one-half hour to complete the decarboxylation. Carbon dioxide started to evolve when the temperature reached 160°. After cooling, the reaction mixture was crystallized from benzene to yield 1.8 g. of 6-chloro-1,2,3,4-tetrahydrocarbazole-1-acetic acid, having a m.p. of 141°–142.5°.

Analysis Calcd. for $C_{14}H_{14}ClNO_2$ (M.W. 263.72)
C, 63.71; H, 5.35; N, 5.31
Found: C, 63.94; H, 5.24; N, 5.27

EXAMPLE 16

Preparation of racemic 6-chloro-α-methylcarbazole-2-acetic acid methyl ester

A mixture of 1 g. of 6-chloro-α-methylcarbazole-2-acetic acid, 100 ml. of methanol and 3 drops of concentrated sulfuric acid was stirred thoroughly and allowed to stand at room temperature for 24 hours. The solution was concentrated to dryness under reduced pressure and the residue was partitioned between ether and dilute sodium carbonate. The ether layer was separated and washed by extraction with water and dried over anhydrous sodium sulfate. After filtration of the dessicant and evaporation of the ether, 1.2 g. of ester was obtained. Recrystallization from hexane afforded 0.7 g. of racemic 6-chloro-α-methylcarbazole-2-acetic acid methyl ester, having a m.p. of 111°–112°.

Analysis Calcd. for $C_{16}H_{14}ClNO_2$ (M.W. 287.74)
C, 66.78; H, 4.90; N, 4.87
Found: C, 67.09; H, 4.96; N, 4.74
C, 67.14; H, 5.26; N, 4.71

EXAMPLE 17

Preparation of 6-chloro-α-methylcarbazole-2-acetic acid-2-dimethylamino-ethyl ester A solution of 3 g. of 6-chloro-α-methylcarbazole-2-acetic acid in 10 ml. of dimethylformamide was added to a stirred mixture of 0.48 g. of a 54.5 percent dispersion of sodium hydride (in mineral oil) in 30 ml. of dimethylformamide. After the addition, the mixture was stirred for 1 hour at room temperature and a solution of freshly liberated dimethylaminoethylchloride in 10 ml. of dimethylformamide was added dropwise over the course of 10 minutes. After the last addition, the reaction mixture was stirred and heated with the temperature maintained at about 70° for 4 hours. The warm reaction mixture was poured on to 300 g. of ice and when the ice melted the mixture was extracted with ether. The ether solution was in turn extracted with dilute potassium carbonate followed by water and the washed ether solution was dried over anhydrous magnesium sulfate. After the desiccant had been removed by filtration and the ether evaporated under reduced pressure, 2.7 g. remained. Crystallization of the residue from a solution of ether and hexane gave 2.1 g. of 6-chloro-α-methylcarbazole-2-acetic acid-2-dimethylamino-ethyl ester, having a m.p. of 89°–90°.

Analysis Calcd. for $C_{19}H_{21}ClN_2O_2$ (M.W. 344.84)
C, 66.17; H, 6.14; N, 8.13
Found: C, 66.33; H, 6.16; N, 8.12

EXAMPLE 18

Preparation of 6-chloro-9-ethoxycarbonylmethyl-α-methylcarbazole-2-acetic acid ethyl ester A solution of 1.5 g. of 6-chloro-α-methylcarbazole-2-acetic acid ethyl ester in 10 ml. of dimethylformamide was slowly added to a stirred mixture of 0.25 g. of a 54.5 percent dispersion in mineral oil of sodium hydride in 10 ml. of dimethylformamide. After the addition, the mixture was stirred for 30 minutes at room temperature under an atmosphere of dry nitrogen and a solution of 1 g. of ethyl chloroacetate in 5 ml. of dimethylformamide was added dropwise over the course of 10 minutes. After the last addition, the reaction mixture was stirred and heated to about 60° for 7 hours and then poured into 300 ml. of ice water. The mixture was extracted with ether. The ether extract was washed by extraction with water and dried over anhydrous magnesium sulfate. Following filtration of the desiccant and evaporation of the ether, 1.6 g. remained. Trituration of the residue with a mixture of hexane and ether followed by filtration gave 1.0 g. m.p. 80°–87°. Recrystallization from methanol gave 0.7 g. of 6-chloro-9-ethoxycarbonylmethyl-α-methylcarbazole-2-acetic acid ethyl ester, having a m.p. of 87°–88°.

Analysis Calcd. for $C_{21}H_{22}ClNO_4$ (M.W. 387.86)
C, 65.03; H, 5.72; N, 3.61
Found: C, 64.90; H, 5.67; N, 3.59

EXAMPLE 19

Preparation of 9-acetyl-6-chloro-α-methylcarbazole-2-acetic acid methyl ester

A solution of 2.0 g. of 6-chloro-α-methylcarbazole-2-acetic acid methyl ester, 20 ml. of chloroform, 1 ml. of acetic anhydride and 1 drop of concentrated sulfuric acid was stirred and heated at reflux temperature. After 3 hours at reflux, the reaction was cooled and concentrated to dryness under reduced pressure. The residue was partitioned between ether and cold dilute sodium bicarbonate. The ether layer was separated, washed by extraction with water and dried over anhydrous magnesium sulfate. Following filtration of the desiccant and evaporation of the ether 1.9 g. was obtained. Crystallization from a solution of ether and hexane gave 1.1 g. of 9-acetyl-6-chloro-α-methylcarbazole-2-acetic acid methyl ester, having a m.p. of 86°–87°.

Analysis Calcd. for $C_{18}H_{16}ClNO_3$ (M.W. 329.78)
C, 65.55; H, 4.89; N, 4.25
Found: C, 65.74; H, 4.82; N, 4.12

EXAMPLE 20

Preparation of 6-dimethylaminocarbazole-2-acetic acid ethyl ester hydrochloride

A mixture 1.5 g. of 6-aminocarbazole-2-acetic acid ethyl ester, one-half teaspoon of Raney nickel, 100 ml. of methanol and 1.3 g. of 30 percent aqueous formaldehyde was shaken in a Parr bomb under an atmosphere of hydrogen (56 psi) at room temperature for 4 hours. The catalyst was removed by filtration through celite and the filtrate was concentrated to dryness under reduced pressure. The residue was partitioned between chloroform and dilute sodium bicarbonate. The chloroform layer was separated, washed by extraction with water and dried over anhydrous sodium sulfate. After the desiccant had been removed by filtration, dry hydrogen chloride was added to the filtrate. The salt was filtered and washed with ether. Upon air drying, 0.8 g. was obtained. Recrystallization from a mixture of methanol and ethyl acetate gavae 0.3 g. of 6-dimethylaminocarbazole-2-acetic acid ethyl ester hydrochloride, having a m.p. of 129°–131°.

Analysis Calcd. for $C_{18}H_{20}N_2O_2 \cdot HCl$ (M.W. 332.83)
C, 64.95; H, 6.36; N, 8.42
Found: C, 65.13; H, 6.41; N, 8.36

EXAMPLE 21

Preparation of 6-hydroxycarbazole-2-acetic acid

A mixture of 1 g. of 6-methoxycarbazole-2-acetic acid ethyl ester, 5 ml. of glacial acetic acid and 5 ml. of 40 percent aqueous hydrobromic acid was stirred at reflux temperature for 5 hours and the warm solution was poured into 800 ml. of stirred water. Stirring was continued for 20 minutes. The mixture was filtered, washed with water and air dried; yielding 0.6 g. of a tan solid (which gave a slight positive test with ferric chloride). Recrystallization from methanol afforded 0.3 g.

of 6-hydroxycarbazole-2-acetic acid, having a m.p. of 280°–282°.

Analysis Calcd. for $C_{14}H_{11}NO_3$ (M.W. 241.24)
C, 69.69; H, 4.60; N, 5.81
Found: C, 69.85; H, 4.68; N, 5.65

EXAMPLE 22

Preparation of rac. 6-chloro-α-methyl-carbazole-2-acetic acid ethyl ester

A mixture of 10 g. of 6-chloro-α-methyl-carbazole-2-acetic acid and 400 ml. of ethanol containing 2 g. hydrogen chloride (gas) was refluxed and stirred under an atmosphere of nitrogen for 12 hours and allowed to remain at room temperature overnight. Benzene (50 ml.) was added and the reaction mixture was concentrated to dryness under reduced pressure. The residue was dissolved in 200 ml. of ethanol (2B). Thereafter, 2 g. of hydrogen chloride (gas) was added and the solution was again refluxed for 5 hours. The reaction mixture was cooled (about 50°). Then, 50 ml. of benzene was added and the solution was concentrated to dryness. The residue was dissolved in ether (400 ml.). The ether solution was extracted with dilute potassium carbonate (100 ml. of 0.01 M) and then with water (2 × 100 ml.). Following drying over anhydrous magnesium sulfate, the desiccant was removed by filtration and the ether evaporated; yielding 10.6 g. (96 percent). Recrystallization from methanol yielded 8.1 g. of rac. 6-chloro-α-methyl-carbazole-2-acetic acid ethyl ester (74 percent) having m.p. of 106°–107°.

EXAMPLE 23

Preparation of 2-(6-chloro-2-carbazolyl)propanol

Into a 500 ml., 3-neck flask equipped with a stirrer, condenser, thermometer, dropping funnel and under an atmosphere of dry nitrogen was placed 30 ml. of ether and 0.5 g. of lithium aluminum hydride. The mixture was stirred and a solution of 1 g. of 6-chloro-α-methyl-carbazole-2-acetic acid ethyl ester in 80 ml. of ether was added dropwise over the course of 20 minutes. After the addition was completed, the reaction mixture was heated (water bath) to reflux and allowed to reflux and stirred for 10 hours. Then, the reaction mixture was cooled by means of an ice water bath and 30 ml. of cold water was added dropwise at such a rate then the temperature never exceeds +10°. Following the addition of water, the mixture was stirred for 1.5 hours at room temperature and filtered. The filter cake and the flask were washed with two 25 ml. portions of ether. The combined filtrates and washings were dried over anhydrous magnesium sulfate. Filtration of the desiccant and evaporation of the ether gave a residue of 0.8 g. (93.3 percent). Recrystallization of the product from benzene gave 0.7 g. (8.15 percent) of 2-(6-chloro-2-carbazolyl) propanol having m.p. of 170°–171.5°.

EXAMPLE 24

In accordance with the procedure of Example 22, (−) 6-chloro-α-methylcarbazole-2-acetic acid is converted to the corresponding optically active 6-chloro-α-methylcarbazole-2-acetic acid ethyl ester. Then, in accordance with the procedure of Example 23, the optically active 6-chloro-α-methylcarbazole-2-acetic acid ethyl ester is converted to the (+) 2-(6-chloro-2-carbazolyl)propanol having an m.p. of 186°–187.5° (benzene) $[\alpha]_D^{22} = +20.6$ (c 1.81 $CH_3OH$).

EXAMPLE 25

In accoardance with the procedure of Example 22, (+) 6-chloro-α-methylcarbazole-2-acetic acid is converted to the corresponding optically active 6-chloro-α-methylcarbazole-2-acetic acid ethyl ester. Then, in accordance with the procedure of Example 23, the optically active 6-chloro-α-methylcarbazole-2-acetic acid ethyl ester is converted to the (−) 2-(6-chloro-2-carbazolyl)propanol having a m.p. of 186°–186.5°, $[\alpha]_D^{22} = -20.6$ (c 1.6 $CH_3OH$).

EXAMPLE 26

6-Chloro-α-methyl-carbazole-2-acetic acid

| Suppository Formulation | Per 1.3 Gm. Suppository |
| --- | --- |
| 6-chloro-α-methyl-carbazole-2-acetic acid | 0.025 gm. |
| Wecobee M* | 1.230 gm. |
| Carnauba Wax | 0.045 gm. |

*E. F. Drew Company, 522 Fifth Avenue, New York, N.Y.

Procedure:

1. The Wecobee M and the carnauba wax were melted in a suitable size glass-lined container (stainless steel may also be used), mixed well and cooled to 45°C.
2. 6-chloro-α-methyl-carbazole-2-acetic acid, which had been reduced to a fine powder with no lumps, was added and stirred until completely and uniformly dispersed.
3. The mixture was poured into suppository molds to yield suppositories having an individual weight of 1.3 gms.
4. The suppositories were cooled and removed from molds. They were individually wrapped in wax paper for packaging. (Foil may also be used).

EXAMPLE 27

6-chloro-α-methyl-carbazole-2-acetic acid

| Tablet Formulation | Per Tablet |
| --- | --- |
| 6-chloro-α-methyl-carbazole-2-acetic acid | 25.00 mg. |
| Lactose, U.S.P. | 64.50 mg. |
| Corn Starch | 10.00 mg. |
| Magnesium Stearate | 0.50 mg. |

Procedure:

1. 6-chloro-α-methyl-carbazole-2-acetic acid was mixed with the lactose, corn starch and magnesium stearate in a suitable mixer.
2. The mixture was further blended by passing through a Fitzpatrick Comminuting Machine fitted with a No. 1A screen with knives forward.
3. The mixed powders were slugged on a tablet compressing machine.
4. The slugs were comminuted to a suitable mesh size (No. 16 screen) and mixed well.
5. The tablets were compressed at a tablet weight of 100 mg. using tablet punches having a diameter of approximately one-fourth inch. (Tablets may be either flat or biconvex and may be scored if desired.)

EXAMPLE 28

6-chloro-α-methyl-carbazole-2-acetic acid

Capsule Formulation

|  | Per Capsule |
|---|---|
| 6-chloro-α-methyl-carbazole-2-acetic acid | 50 mg. |
| Lactose, U.S.P. | 124 mg. |
| Corn Starch, U.S.P. | 30 mg. |
| Talc, U.S.P. | 5 mg. |
| Total Weight | 210 mg. |

Procedure:
1. 6-chloro-α-methyl-carbazole-2-acetic acid was mixed with lactose and corn starch in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into No. 4 hard shell gelatin capsules on a Parke Davis capsulating machine.

EXAMPLE 29

6-chloro-α-methyl-carbazole-2-acetic acid

Parenteral Formulation

| Each 1 cc. ampul contains: | Per cc.: |
|---|---|
| 6-chloro-α-methyl-carbazole-2-acetic acid | 10.2 mg. (2 percent excess) |
| Methyl Paraben, U.S.P. | 1.8 mg. |
| Propyl Paraben, U.S.P. | 0.2 mg. |
| Sodium Hydroxide, U.S.P. q.s. ph | 9.0 |
| Water for Injection, U.S.P. q.s. ad | 1 cc. |

Procedure (For 10,000 cc.):
1. In a clean glass or glass-lined vessel, 8,000 cc. of Water for Injection were heated to 90°C. It was then cooled to 50°–60°C. and 18 gms. of methyl paraben and 2 gms. of propyl paraben were added and dissolved with stirring. The solution was then allowed to cool to room temperature.
2. The 102.0 gms. of 6-chloro-α-methyl-carbazole-2-acetic acid were added under an atmosphere of nitrogen and stirred until completely dispersed.
3. The sodium hydroxide was added as a 10 percent solution until the pH was adjusted to 9.0 plus or minus 0.2, and the drug was completely dissolved.
4. Sufficient water for injection was then added to make a total volume of 10,000 cc.
5. This solution was then filtered through an 02 Selas candle, filled into suitable size ampuls, gassed with nitrogen and sealed. It was autoclaved at 10 lbs. PSI for 30 minutes.

We claim:
1. A compound of the formula

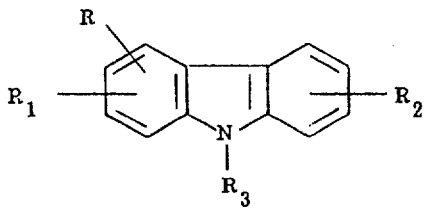

wherein R is hydrogen, halogen, hydroxy, cyano, lower alkyl, hydroxy-lower alkyl, lower alkoxy, acetyl, benzyloxy, lower alkylthio, trifuloromethyl, carboxy, carbo-lower alkoxy, nitro, amino, mono-lower alkylamino, di-lower alkylamino, sulfamoyl, di-lower alkylsulfamoyl or difluoromethylsulfonyl; $R_1$ is halogen, cyano, hydroxy-lower alkyl, lower alkoxy, acetyl, acetamido, benzyloxy, lower alkylthio, trifluoromethyl, hydroxy, carboxy, carbo-lower alkoxy, nitro, amino, mono-lower alkylamino, di-lower alkylamino, sulfamoyl, di-lower alkylsulfamoyl or difluoromethylsulfonyl; or R taken together with an adjacent $R_1$ is also lower alkylenedioxy; $R_2$ is

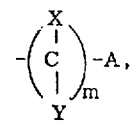

wherein A is hydroxy, lower alkoxy, amino-lower alkoxy, mono-lower alkylamino-lower alkoxy or di-lower alkylamino-lower alkoxy, X and Y, independently, are hydrogen or lower alkyl, and $m$ is 1 to 7, or $R_2$ is

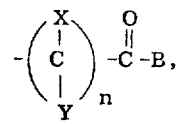

wherein B is hydroxy, lower alkoxy, amino, hydroxy-amino, mono-lower alkylamino, di-lower alkylamino, amino-lower alkoxy, mono-lower alkylamino-lower alkoxy or di-lower alkylamino-lower alkoxy, Y and X, independently, are hydrogen or lower alkyl, and n is 1 to 7 and $R_3$ is hydrogen, lower alkyl, lower alkoxycarbonyl-lower alkyl, carboxy-lower alkyl, lower alkanoyl, halo-substituted lower alkanoyl, benzyl, halo-benzyl, benzoyl or halo-benzoyl; and
when X and Y are different, their enantiomers; when R or $R_1$ is carboxy and/or when B is hydroxy, salts thereof with pharmaceutically acceptable bases; and when R or $R_1$ is amino, mono-lower alkylamino or di-lower alkylamino, and/or when B or A is amino-lower alkoxy, mono-lower alkylamino-lower alkoxy or di-lower alkylamino-lower alkoxy, addition salts thereof with pharmaceutically acceptable acids.
2. A compound of the formula

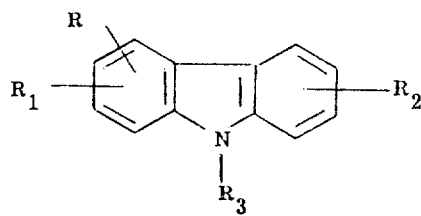

wherein R is hydrogen, $R_1$ is halogen, lower alkoxy, trifluoromethyl or di-lower alkylamino; $R_2$ is

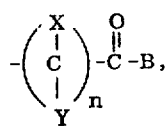

wherein B is hydroxy, lower alkoxy, amino, hydroxyamino, mono-lower alkylamino, di-lower alkylamino, amino-lower alkoxy, mono-lower alkylamino-lower alkoxy or di-lower alkylamino-lower alkoxy; $R_3$ is hydrogen or lower alkyl; Y and X, independently, are hydrogen or lower alkyl and n is 1 to 7;

and when X and Y are different, their enantiomers; when B is hydroxy, salts thereof with pharmaceutically acceptable bases; and when $R_1$ is di-lower alkylamino, and/or B is amino-lower alkoxy, mono-lower alkylamino-lower alkoxy or di-lower alkylamino-lower alkoxy, addition salts thereof with pharmaceutically acceptable acids.

3. A compound in accordance with claim 2, wherein $n$ is 1.

4. A compound in accordance with claim 3, wherein B is hydroxy.

5. A compound in accordance with claim 1, wherein $R_1$ is chloro.

6. A compound in accordance with claim 5, racemic 6-chloro-α-methyl-carbazole-2-acetic acid.

7. A compound in accordance with claim 6, (+) 6-chloro-α-methyl-carbazole-2-acetic acid.

8. A compound in accordance with claim 6, (−) 6-chloro-α-methyl-carbazole-2-acetic acid.

9. A compound in accordance with claim 5, 6-chloro-carbazole-2-acetic acid.

10. A compound in accordance with claim 5, 6-chloro-9-methyl-carbazole-1-acetic acid.

11. A compound of the formula

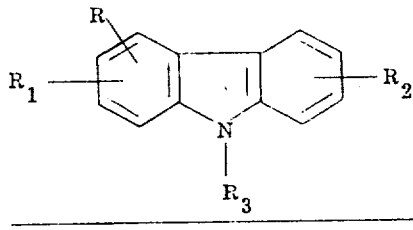

wherein R is hydrogen, $R_1$ is halogen, $R_2$ is

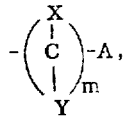

wherein

A is hydroxy or lower alkoxy; X and Y, independently, are hydrogen or lower alkyl, m is 1 to 7, and $R_3$ is hydrogen, and when X and Y are different, their enantiomers.

12. A compound in accordance with claim 11, wherein m is 1.

13. A compound in accordance with claim 12, wherein A is hydroxy.

14. A compound in accordance with claim 13, wherein $R_1$ is chloro.

15. A compound in accordance with claim 14, racemic 2-(6-chloro-2-carbazolyl)-propanol.

16. A compound in accordance with claim 15, (+) 2-(6-chloro-2-carbazolyl)propanol.

17. A compound in accordance with claim 15, (−) 2-(6-chloro-2-carbazolyl)propanol.

18. A compound of the formula

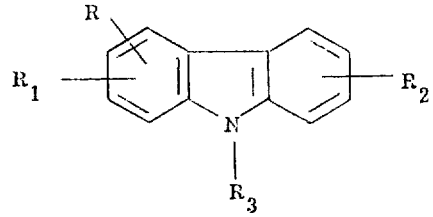

wherein R is hydrogen; $R_1$ is halogen; $R_2$ is

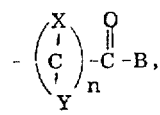

wherein

B is hydroxy, lower alkoxy, amino, hydroxyamino, mono-lower alkylamino, di-lower alkylamino, amino-lower alkoxy, mono-lower alkylamino-lower alkoxy or di-lower alkylamino-lower alkoxy; Y and X, independently, are hydrogen or lower alkyl; $n$ is 1 to 7, and $R_3$ is hydrogen;

and when X and Y are different, their enantiomers; when B is hydroxy, salts thereof with pharmaceutically acceptable bases; and when B is amino-lower alkoxy, mono-lower alkylamino-lower alkoxy or di-lower alkylamino-lower alkoxy, addition salts thereof with pharmaceutically acceptable acids.

19. A compound in accordance with claim 2, 6-chloro-α-methyl-carbazole-2-acetic acid ethyl ester.

20. A compound in accordance with claim 2, 6-chloro-α-methyl-carbazole-2-acetic acid-2-dimethylamino ethyl ester.

* * * * *

UNITED STATES PATENT AND TRADEMARK OFFICE

CERTIFICATE EXTENDING PATENT TERM
UNDER 35 U.S.C. 156

Patent No.    : 3,896,145

Dated         : July 22, 1975

Inventor(s)   : Leo Berger et al

Patent Owner  : Hoffman - La Roche Inc.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Twenty-Eighth day of December 1988.

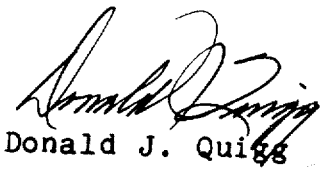

Donald J. Quigg

Assistant Secretary and Commissioner
of Patents and Trademarks